United States Patent
Oh et al.

(10) Patent No.: US 12,550,118 B2
(45) Date of Patent: Feb. 10, 2026

(54) METHOD AND DEVICE FOR TRANSMITTING AND RECEIVING PAGING IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Hoondong Noh, Suwon-si (KR); Hyoungju Ji, Suwon-si (KR); Jinhyun Park, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 18/005,569

(22) PCT Filed: Jun. 16, 2021

(86) PCT No.: PCT/KR2021/007568
§ 371 (c)(1),
(2) Date: Jan. 13, 2023

(87) PCT Pub. No.: WO2022/014878
PCT Pub. Date: Jan. 20, 2022

(65) Prior Publication Data
US 2023/0284180 A1    Sep. 7, 2023

(30) Foreign Application Priority Data

Jul. 14, 2020    (KR) ........................ 10-2020-0087121

(51) Int. Cl.
*H04W 68/02*    (2009.01)
*H04W 56/00*    (2009.01)
(Continued)

(52) U.S. Cl.
CPC ....... *H04W 68/02* (2013.01); *H04W 56/0015* (2013.01); *H04W 72/1273* (2013.01); *H04W 72/232* (2023.01)

(58) Field of Classification Search
CPC ..... H04B 7/0695; H04L 5/001; H04L 5/0032; H04L 5/0053; H04W 72/044;
(Continued)

(56) References Cited

U.S. PATENT DOCUMENTS 10,681,673 B2    6/2020    Hong
11,039,325 B2 *  6/2021    Jung ..................... H04W 24/04
(Continued)

FOREIGN PATENT DOCUMENTS

CN    108282861 A    7/2018
CN    110063030 A    7/2019
(Continued)

OTHER PUBLICATIONS

U.S. Appl. No. 63/036,794 (Year: 2020).*
(Continued)

*Primary Examiner* — Dung B Huynh

(57) ABSTRACT

The disclosure relates to a 5th generation (5G) or pre-5G communication system for supporting a higher data transmission rate than 4th generation (4G) communication systems such as long-term evolution (LTE) systems. According to various embodiments of the disclosure, a method by a UE for a paging in a wireless communication system comprises receiving, from a base station, configuration information including at least one of information about a control resource set and information about a search space related to a PDCCH for the paging, identifying a synchronization signal block (SSB) corresponding to a PDCCH monitoring occasion in a control resource set and a search space set based on the configuration information, and performing
(Continued)

PDCCH monitoring for the paging using the same reception beam as a reception beam used when receiving the synchronization signal block (SSB) and receiving a paging message on a PDSCH scheduled through the PDCCH.

20 Claims, 16 Drawing Sheets

(51) Int. Cl.
*H04W 72/1273* (2023.01)
*H04W 72/232* (2023.01)

(58) Field of Classification Search
CPC . H04W 72/1268; H04W 72/21; H04W 76/19; H04W 88/06; Y02D 30/70
See application file for complete search history.

(56) References Cited

U.S. PATENT DOCUMENTS

| | | | | |
|---|---|---|---|---|
| 11,785,601 B2* | 10/2023 | Jung | ........................ | H04W 72/23 370/329 |
| 11,824,697 B2* | 11/2023 | Li | ........................ | H04W 72/04 |
| 11,917,580 B2* | 2/2024 | Chun | ........................ | H04W 8/183 |
| 12,185,339 B2* | 12/2024 | Liu | ........................ | H04L 5/0053 |
| 12,267,269 B2* | 4/2025 | Chen | ........................ | H04W 68/005 |
| 12,267,779 B2* | 4/2025 | Lee | ........................ | H04W 52/0229 |
| 2014/0056246 A1* | 2/2014 | Chun | ........................ | H04W 52/18 370/329 |
| 2019/0215886 A1* | 7/2019 | Lee | ........................ | H04W 48/10 |
| 2019/0313445 A1* | 10/2019 | Tsai | ........................ | H04L 5/0048 |
| 2019/0327710 A1 | 10/2019 | Liu et al. | | |
| 2019/0334687 A1* | 10/2019 | Su | ........................ | H04L 5/0053 |
| 2019/0356524 A1* | 11/2019 | Yi | ........................ | H04B 7/0617 |
| 2019/0394749 A1 | 12/2019 | Islam et al. | | |
| 2020/0053670 A1* | 2/2020 | Jung | ........................ | H04W 56/0015 |
| 2020/0059345 A1* | 2/2020 | Pelletier | ........................ | H04B 7/00 |
| 2020/0120634 A1 | 4/2020 | Lee et al. | | |
| 2020/0169446 A1* | 5/2020 | Chen | ........................ | H04B 7/0695 |
| 2020/0404617 A1* | 12/2020 | Murray | ........................ | H04W 16/28 |
| 2021/0045098 A1* | 2/2021 | Bi | ........................ | H04W 68/02 |
| 2021/0136727 A1* | 5/2021 | Lee | ........................ | H04W 48/10 |
| 2021/0307077 A1* | 9/2021 | Ohara | ........................ | H04L 5/0048 |
| 2021/0314910 A1* | 10/2021 | Rune | ........................ | H04L 5/0094 |
| 2021/0314997 A1* | 10/2021 | Seo | ........................ | H04L 5/0053 |
| 2021/0329645 A1* | 10/2021 | Yang | ........................ | H04W 72/0446 |
| 2021/0385785 A1* | 12/2021 | Lee | ........................ | H04W 68/005 |
| 2021/0385786 A1* | 12/2021 | Nam | ........................ | H04W 24/08 |
| 2021/0385800 A1* | 12/2021 | Harada | ........................ | H04L 5/0048 |
| 2021/0392505 A1* | 12/2021 | Harada | ........................ | H04W 74/0808 |
| 2021/0410129 A1* | 12/2021 | Freda | ........................ | H04W 72/20 |
| 2022/0015146 A1* | 1/2022 | Rune | ........................ | H04W 74/0816 |
| 2022/0021500 A1* | 1/2022 | Harada | ........................ | H04L 5/0053 |
| 2022/0038244 A1* | 2/2022 | Zhang | ........................ | H04L 1/1861 |
| 2022/0046589 A1* | 2/2022 | Takeda | ........................ | H04W 72/046 |
| 2022/0086914 A1* | 3/2022 | Lee | ........................ | H04W 16/14 |
| 2022/0095253 A1* | 3/2022 | Harada | ........................ | H04W 56/00 |
| 2022/0116911 A1* | 4/2022 | Lee | ........................ | H04W 68/00 |
| 2022/0116975 A1* | 4/2022 | Yang | ........................ | H04W 24/02 |
| 2022/0124466 A1* | 4/2022 | Ali | ........................ | H04W 80/02 |
| 2022/0124648 A1* | 4/2022 | Harada | ........................ | H04W 72/23 |
| 2022/0132545 A1* | 4/2022 | Lee | ........................ | H04L 1/1896 |
| 2022/0141780 A1* | 5/2022 | Harada | ........................ | H04W 56/0015 370/503 |
| 2022/0150800 A1* | 5/2022 | Harada | ........................ | H04L 5/0091 |
| 2022/0159617 A1* | 5/2022 | Shih | ........................ | H04W 68/005 |
| 2022/0159693 A1* | 5/2022 | Zhou | ........................ | H04W 72/23 |
| 2022/0174624 A1* | 6/2022 | Wu | ........................ | H04L 5/0094 |
| 2022/0200852 A1* | 6/2022 | Sudou | ........................ | H04W 4/50 |
| 2022/0263618 A1* | 8/2022 | Harada | ........................ | H04L 5/0048 |
| 2022/0272681 A1* | 8/2022 | Harada | ........................ | H04W 48/12 |
| 2022/0279491 A1* | 9/2022 | Fan | ........................ | H04L 5/0053 |
| 2022/0338140 A1* | 10/2022 | Zhang | ........................ | H04L 5/0092 |
| 2022/0353710 A1* | 11/2022 | Yoshioka | ........................ | H04W 72/1273 |
| 2022/0360380 A1* | 11/2022 | Lei | ........................ | H04L 5/0037 |
| 2022/0369282 A1* | 11/2022 | Bhattad | ........................ | H04W 16/14 |
| 2022/0376975 A1* | 11/2022 | Chen | ........................ | H04L 41/0863 |
| 2022/0377683 A1* | 11/2022 | Myung | ........................ | H04W 74/0816 |
| 2023/0007624 A1* | 1/2023 | Murray | ........................ | H04W 68/005 |
| 2023/0026316 A1* | 1/2023 | Chen | ........................ | H04W 68/00 |
| 2023/0033126 A1* | 2/2023 | Agiwal | ........................ | H04B 17/318 |
| 2023/0050480 A1* | 2/2023 | Zhu | ........................ | H04L 5/0023 |
| 2023/0079891 A1* | 3/2023 | Shreevastav | ........................ | H04W 64/003 342/458 |
| 2023/0093727 A1* | 3/2023 | Lin | ........................ | H04L 1/0061 370/312 |
| 2023/0127023 A1* | 4/2023 | Reial | ........................ | H04W 52/0235 370/318 |
| 2023/0156858 A1* | 5/2023 | Freda | ........................ | H04W 52/0216 370/329 |
| 2023/0180307 A1* | 6/2023 | Zhang | ........................ | H04W 76/10 370/329 |
| 2023/0189147 A1* | 6/2023 | Bala | ........................ | H04W 68/02 370/311 |
| 2023/0198602 A1* | 6/2023 | Zeineddine | ........................ | H04W 76/19 370/329 |
| 2023/0199713 A1* | 6/2023 | Sanchez | ........................ | H04W 24/08 370/329 |
| 2023/0209462 A1* | 6/2023 | Tsai | ........................ | H04W 52/0235 370/311 |
| 2023/0209463 A1* | 6/2023 | Shih | ........................ | H04W 52/0216 370/311 |
| 2023/0209464 A1* | 6/2023 | Tsai | ........................ | H04W 52/0216 370/311 |
| 2023/0209485 A1* | 6/2023 | Wei | ........................ | H04W 56/0015 370/503 |
| 2023/0224800 A1* | 7/2023 | Murray | ........................ | H04W 72/1273 370/329 |
| 2023/0269639 A1* | 8/2023 | Lei | ........................ | H04W 72/044 370/331 |
| 2023/0388089 A1* | 11/2023 | Kwak | ........................ | H04W 72/04 |
| 2024/0049287 A1* | 2/2024 | Lee | ........................ | H04W 74/004 |
| 2024/0080932 A1* | 3/2024 | Wu | ........................ | H04L 5/0053 |
| 2024/0179599 A1* | 5/2024 | Lei | ........................ | H04W 36/30 |
| 2024/0305353 A1* | 9/2024 | Yuan | ........................ | H04B 7/024 |
| 2024/0314874 A1* | 9/2024 | Cirik | ........................ | H04W 72/1268 |
| 2024/0334335 A1* | 10/2024 | Zhou | ........................ | H04W 72/23 |
| 2025/0007592 A1* | 1/2025 | He | ........................ | H04L 1/0061 |
| 2025/0008517 A1* | 1/2025 | Li | ........................ | H04B 7/0695 |
| 2025/0056548 A1* | 2/2025 | Lei | ........................ | H04L 5/0048 |
| 2025/0071767 A1* | 2/2025 | Oteri | ........................ | H04B 7/0695 |
| 2025/0192934 A1* | 6/2025 | Varatharaajan | ........................ | H04L 5/0044 |
| 2025/0193894 A1* | 6/2025 | Hu | ........................ | H04W 72/0453 |

FOREIGN PATENT DOCUMENTS

| | | |
|---|---|---|
| KR | 10-2020-0028822 A | 3/2020 |
| WO | 2018144873 A1 | 8/2018 |
| WO | 2019099661 A1 | 5/2019 |
| WO | 2020/089854 A1 | 5/2020 |

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304 V16.0.0 (Mar. 2020), 38 pages.
International Search Report dated Sep. 8, 2021 in connection with International Patent Application No. PCT/KR2021/007568, 2 pages.
Written Opinion of the International Searching Authority dated Sep. 8, 2021 in connection with International Patent Application No. PCT/KR2021/007568, 4 pages.
Supplementary European Search Report dated Nov. 7, 2023, in connection with European Application No. 21842303.6, 12 pages.
Huawei, et al., "Finalization of NR Paging," R1-1719373, 3GPP TSG RAN WG1 Meeting #91, Reno, USA, Nov. 27-Dec. 1, 2017, 7 pages.
LG Electronics, "Paging design in NR," R1-171929, 3GPP TSG RAN WG1 Meeting NR#90bis, Prague, CZ, Oct. 9-13, 2017, 7 pages.

(56) References Cited

OTHER PUBLICATIONS

Notification of the First Office Action dated May 13, 2025, in connection with Chinese Application No. 202180060625.5, 13 pages.
Examination report dated Apr. 1, 2025, in connection with Indian Application No. 202317007881, 5 pages.
The Second Office Action dated Dec. 24, 2025, in connection with Chinese Application No. 202180060625.5, 12 pages.

* cited by examiner

METHOD AND DEVICE FOR TRANSMITTING AND RECEIVING PAGING IN WIRELESS COMMUNICATION SYSTEM

CROSS-REFERENCE TO RELATED APPLICATIONS

This application is a 371 of International Patent Application No. PCT/KR2021/007568 filed on Jun. 16, 2021, which claims priority to Korean Patent Application No. 10-2020-0087121 filed on Jul. 14, 2020, in the Korean Intellectual Property Office, the disclosures of which are herein incorporated by reference in their entirety.

BACKGROUND

1. Field

The disclosure generally relates to wireless communication systems, and more specifically, to a device and method for performing paging in a wireless communication system.

2. Description of the Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on ultra-high frequency bands (mm Wave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (COMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, healthcare, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a big data processing technique may be said to be an example of the convergence of the 5G and IoT technologies.

SUMMARY

The disclosure provides a device and method for efficiently performing paging in a wireless communication system.

The disclosure provides a device and method for efficiently performing paging by configuring various configuration information for PDCCH monitoring in a wireless communication system.

According to an embodiment of the disclosure, a method by a UE configured to receive a paging in a wireless communication system comprises receiving, from a base station, configuration information including at least one of information about a control resource set and information about a search space related to a physical downlink control channel (PDCCH) for the paging, identifying a synchronization signal block (SSB) corresponding to a PDCCH monitoring occasion in a control resource set and a search space set based on the configuration information, and performing PDCCH monitoring for the paging using the same reception beam as a reception beam used when receiving the synchronization signal block (SSB) and receiving a paging message on a physical downlink shared channel (PDSCH) scheduled through the PDCCH.

Further, according to an embodiment of the disclosure, a UE in a wireless communication system comprises a transceiver and a processor configured to receive, from a base station through the transceiver, configuration information including at least one of information about a control resource set and information about a search space related to a PDCCH for a paging, identify a synchronization signal block (SSB) corresponding to a PDCCH monitoring occasion in a control resource set and a search space set based on the configuration information, and perform PDCCH monitoring for the paging using the same reception beam as a reception beam used when receiving the synchronization signal block (SSB) and receive a paging message on a PDSCH scheduled through the PDCCH.

Further, according to an embodiment of the disclosure, a method by a base station configured to transmit a paging in a wireless communication system comprises transmitting configuration information including at least one of information about a control resource set and information about a search space related to a PDCCH for the paging, identifying a synchronization signal block (SSB) corresponding to a PDCCH monitoring occasion in a control resource set and a search space set based on the configuration information, and performing PDCCH transmission and PDSCH transmission for the paging using the same transmission beam as a transmission beam used when transmitting the synchronization signal block (SSB).

Further, according to an embodiment of the disclosure, a base station in a wireless communication system comprises a transceiver and a processor configured to transmit configuration information including at least one of information about a control resource set and information about a search space related to a PDCCH for a paging, identify a synchronization signal block (SSB) corresponding to a PDCCH monitoring occasion in a control resource set and a search space set based on the configuration information, and perform PDCCH transmission and PDSCH transmission for the paging using the same transmission beam as a transmission beam used when transmitting the synchronization signal block (SSB).

DETAILED DESCRIPTION

Figure 1:
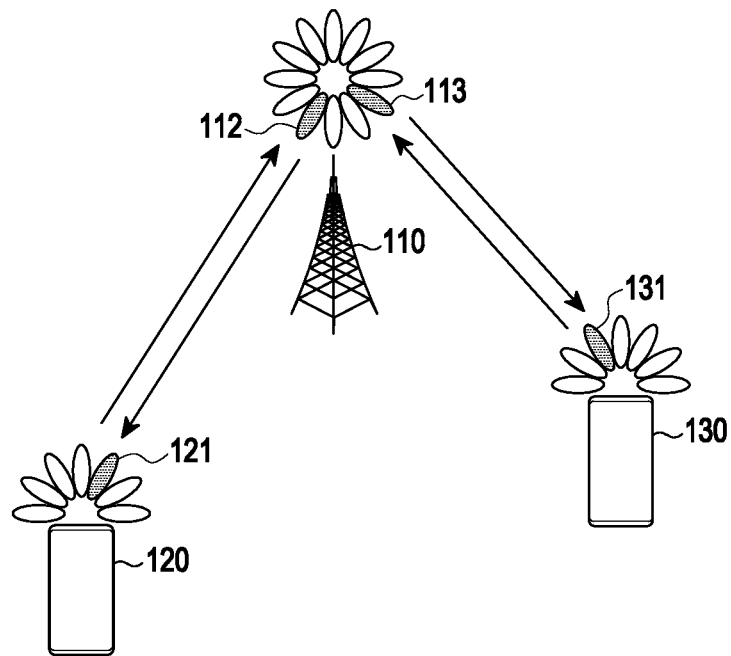
FIG. 1 illustrates a wireless communication system according to various embodiments of the disclosure.

The terms as used herein are provided merely to describe some embodiments thereof, but not to limit the scope of other embodiments of the present disclosure. It is to be understood that the singular forms include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Methods described below in connection with embodiments are based on hardware. However, embodiments of the disclosure encompass technology using both hardware and software and thus do not exclude software-based methods.

It should be appreciated that the blocks in the drawings and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of a wireless communication system, the LTE system adopts orthogonal frequency division multiplexing (OFDM) for downlink and single carrier frequency division multiple access (SC-FDMA) for uplink. Uplink means a wireless link where the user equipment (UE) (or mobile station (MS) transmits data or control signals to the base station (BS, or eNode B), and downlink means a wireless link where the base station transmits data or control signals to the UE. Such multiple access scheme may typically allocate and operate time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that simultaneously meet various requirements. Services considered for 5G communication systems include, e.g., enhanced mobile broadband (eMBB), massive machine type communication (MMTC), and ultra-reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on downlink and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

mMTC is also considered to support application services, such as internet of things (IoT) in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life, e.g., 10 years to 15 years.

URLLC is a mission-critical, cellular-based wireless communication service. For example, URLLC may be considered for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of 75 or less. Thus, for URLLC-supportive services, the 5G communication system may be required to provide a shorter transmit time interval (TTI) than those for other services while securing reliable communication links by allocating a broad resource in the frequency band.

The above-described three 5G services, i.e., eMBB, URLLC, and mMTC, may be multiplexed in one system and be transmitted. In this case, the services may adopt different TX/RX schemes and TX/RX parameters to meet their different requirements. Of course, 5G is not limited to the above-described three services.

The description of embodiments of the disclosure focuses primarily on the radio access network, new RAN (NR), and the core network, packet core (5G system, or 5G core network, or NG core, or next generation core), which are specified by the 3rd generation partnership (3GPP) which is a mobile communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

For ease of description, some of the terms or names defined in the 3rd generation partnership project (3GPP) standards (standards for 5G, new radio (NR), long-term evolution (LTE), or similar systems) may be used. However, the disclosure is not limited by such terms and names and may be likewise applicable to systems conforming to other standards. As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

FIG. 1 illustrates a wireless communication system according to various embodiments of the disclosure.

FIG. 1 exemplifies a base station 110 and UEs 120 and 130 as some nodes using wireless channels in the wireless communication system. Although only one base station is illustrated in FIG. 1, other base stations identical or similar to the base station 110 may be further included.

The base station 110 is a network infrastructure that provides wireless access to the UEs 120 and 130. The base station 110 has a coverage defined as a certain geographic area based on a distance within which it may transmit signals. The base station 110 may be denoted in other terms, such as an 'access point (AP)', an 'eNodeB (eNB)', a '5th generation (5G) node', a next generation nodeB (gNB)', a 'wireless point', or a 'transmission/reception point (TRP)' or in other various terms with an equivalent technical meaning thereto.

Each of the UEs 120 and 130 is a device used by the user, and the UE 120 and the base station 110 communicate through a radio channel by using an optimal transmission/reception beam pair 121 and 112. The UE 130 and the base station 110 communicate through a radio channel by using the optimal transmission/reception beam pair 131 and 113. Each of the UEs 120 and 130 may also be denoted by other terms, such as user equipment (UE), mobile station, subscriber station, remote terminal, wireless terminal, user device, or in other various terms with equivalent technical meanings thereto. In some cases, at least one of the UE 120 and the UE 130 may be operated without the user's involvement. In this case, at least one of the UE 120 and the UE 130 may be a device that performs machine type communication (MTC) and may not be carried by the user.

Figure 2:
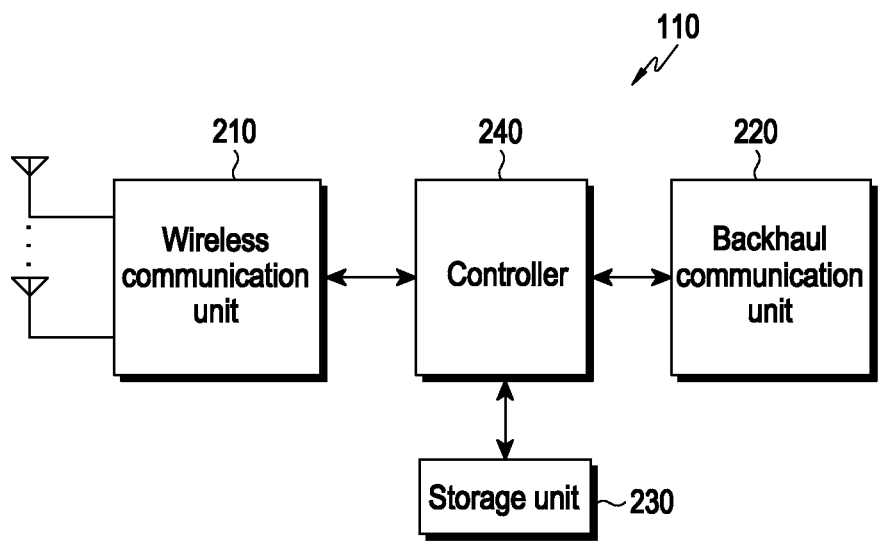
FIG. 2 illustrates a configuration of a base station in a wireless communication system according to various embodiments of the disclosure.

FIG. 2 illustrates a configuration of a base station in a wireless communication system according to various embodiments of the disclosure.

The configuration shown in FIG. 2 may be appreciated as the configuration of the base station 110. Further, the term " . . . unit" and the suffix" . . . er" as used herein denote a unit processing at least one function or operation and be implemented in hardware, software, or a combination thereof.

Referring to FIG. 2, the base station includes a wireless communication unit 210, a backhaul communication unit 220, a storage unit 230, and a controller 240.

The wireless communication unit 210 performs functions for transmitting/receiving signals via a wireless channel. For example, the wireless communication unit 210 performs the function of conversion between a baseband signal and bit stream according to the system physical layer specifications. For example, upon data transmission, the wireless communication unit 210 encodes and modulates a transmission bit stream, thereby generating complex symbols. Further, upon data reception, the wireless communication unit 210 reconstructs the reception bit stream by demodulating and decoding the baseband signal.

Further, the wireless communication unit 210 up-converts the baseband signal into a radio frequency (RF) band signal and transmits the converted signal via an antenna, and the wireless communication unit 5310 down-converts the RF band signal received via an antenna into a baseband signal. To that end, the wireless communication unit 210 may include, e.g., a transmission filter, a reception filter, an amplifier, a mixer, an oscillator, a digital-to-analog converter (DAC), and an analog-to-digital converter (ADC). The wireless communication unit 210 may include multiple transmission/reception paths. Further, the wireless communication unit 210 may include at least one antenna array constituted of multiple antenna elements.

In terms of hardware, the wireless communication unit 210 may be configured of a digital unit or analog unit, and the analog unit may be constituted of multiple sub units depending on the operation power and operation frequency. The digital unit may be implemented as at least one processor (e.g., a digital signal processor (DSP)).

The wireless communication unit 210 transmits and receives signals as described above. Thus, the whole or part of the wireless communication unit 210 may be referred to as a 'transmitter,' 'receiver,' or 'transceiver.' Further, transmission and reception performed via a wireless channel in the following description may also mean performing the above-described process by the wireless communication unit 210.

The backhaul communication unit 220 provides an interface for performing communication with other nodes in the network. In other words, the backhaul communication unit 220 may convert the bit string transmitted from the base station to another node, e.g., another access node, another base station, an upper node, or a core network, into a physical signal and converts the physical signal received from another node into a bit stream.

The storage unit 230 stores a basic program for operating the base station, application programs, configuration information, or other data. The storage unit 230 may be configured as a volatile memory, a non-volatile memory, or a combination of a volatile memory and a non-volatile memory. The storage unit 230 provides the stored data according to a request from the controller 240.

The controller 240 controls the overall operation of the base station according to embodiments of the disclosure to be described below. For example, the controller 240 transmits and receives signals through the wireless communication unit 210 or through the backhaul communication unit 220. The controller 240 records and reads data in/from the storage unit 230. The controller 240 may perform the functions of the protocol stack required in the communication specifications. According to another implementation example, the protocol stack may be included in the wireless communication unit 210. To that end, the controller 240 may include at least one processor.

Figure 3:
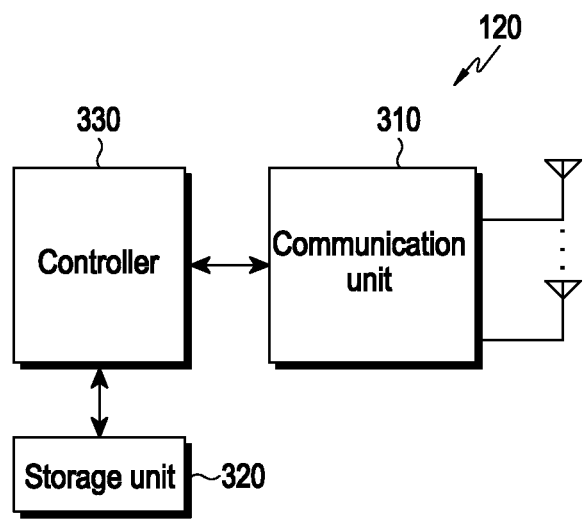
FIG. 3 illustrates a configuration of a UE in a wireless communication system according to various embodiments of the disclosure.

FIG. 3 illustrates a configuration of a UE in a wireless communication system according to various embodiments of the disclosure.

The configuration shown in FIG. 3 may be appreciated as the configuration of the UE 120. Further, the term " . . . unit" and the suffix" . . . er" as used herein denote a unit processing at least one function or operation and be implemented in hardware, software, or a combination thereof.

Referring to FIG. 3, the UE includes a communication unit 310, a storage unit 320, and a controller 330.

The communication unit 310 performs functions to transmit/receive signals via a wireless channel. For example, the communication unit 310 performs the function of conversion between a baseband signal and bit stream according to the system physical layer specifications. For example, upon data transmission, the communication unit 310 encodes and modulates a transmission bit stream, thereby generating complex symbols. Further, upon data reception, the communication unit 310 reconstructs the reception bit stream by demodulating and decoding the baseband signal. Further, the communication unit 310 frequency up-converts the baseband signal into an RF band signal and transmits the converted signal via an antenna, and the wireless communication unit 210 frequency down-converts the RF band signal received via an antenna into a baseband signal. For example, the communication unit 310 may include a transmission filter, a reception filter, an amplifier, a mixer, an oscillator, a DAC, and an ADC.

The communication unit 310 may include multiple transmission/reception paths. Further, the communication unit 310 may include at least one antenna array constituted of multiple antenna elements. In terms of hardware, the communication unit 310 may be configured of a digital circuit and an analog circuit (e.g., a radio frequency integrated circuit (RFIC)). Here, the digital circuit and analog circuit may be implemented in a single package. The communication unit 310 may include multiple RF chains. Further, the communication unit 310 may perform beamforming.

The communication unit 310 transmits and receives signals as described above. Thus, the whole or part of the communication unit 310 may be referred to as a 'transmitter,' 'receiver,' or 'transceiver.' Further, transmission and reception performed via a wireless channel in the following description may also mean performing the above-described process by the communication unit 310.

The storage unit 320 stores a basic program for operating the UE, application programs, configuration information, or other data. The storage unit 320 may be configured as a volatile memory, a non-volatile memory, or a combination of a volatile memory and a non-volatile memory. The storage unit 320 provides the stored data according to a request from the controller 330.

The controller 330 controls the overall operation of the UE according to embodiments of the disclosure to be described below. For example, the controller 330 transmits and receives signals via the communication unit 310. The controller 330 records and reads data in/from the storage unit 320. The controller 330 may perform the functions of the protocol stack required in the communication specifications. To that end, the controller 330 may include at least one processor or microprocessor or may be part of a processor. Part of the communication unit 310 and the controller 330 may be referred to as a communication processor (CP).

Figure 4:
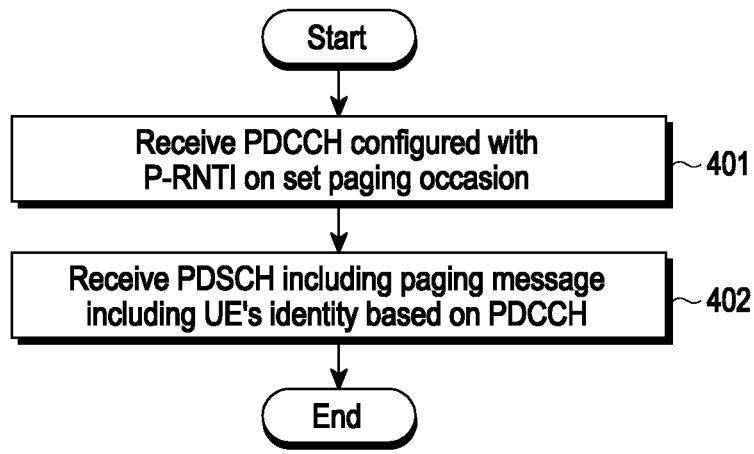
FIG. 4 is a flowchart of a UE in a wireless communication system according to various embodiments of the disclosure.

FIG. 4 is a flowchart of a UE in a wireless communication system according to various embodiments of the disclosure. FIG. 4 illustrates an operation method of the UE 120.

Referring to FIG. 4, in operation 401, the UE receives a physical downlink control channel (PDCCH) configured with a paging-radio network temporary identifier (P-RNTI) on a configured paging occasion. A paging procedure may be used to indicate that there is an incoming call to the UE in the IDLE state or INACTIVE state and to indicate that network access for UEs have commenced or to inform UEs in the CONNECTED state that system information has changed. In the INACTIVE state, the UE has an RRC connection established, and UE-specific DRX may be configured by a higher layer or an RRC layer. The UE may monitor the paging channel and perform adjacent cell measurement and cell (re) selection.

Meanwhile, a paging (message) is transferred from the access and mobility management function (AMF), which performs paging control and mobility control on the UE in the core network, through the base station to the UE. More specifically, paging is started from the AMF and is transferred to the base station by S1 application protocol (S1AP) signaling, and then transferred to the UE by RRC signaling. In this case, the UE may know whether a paging message exists for the UE by monitoring the PDCCH configured with the P-RNTI on a paging occasion. The paging occasion may be determined based on the DRX cycle set by the base station to the UE.

In operation 402, the UE receives a paging message including an identifier of the UE on a physical downlink shared channel (PDSCH) based on the PDCCH. The UE that has received (detected) the PDCCH transmission configured with the P-RNTI may receive a paging message on the PDSCH. The paging message may include UE identifier (UE ID) information about the UE to be awakened by the base station.

The frame structure of the 5G system is described below in more detail with reference to the drawings.

Figure 5:
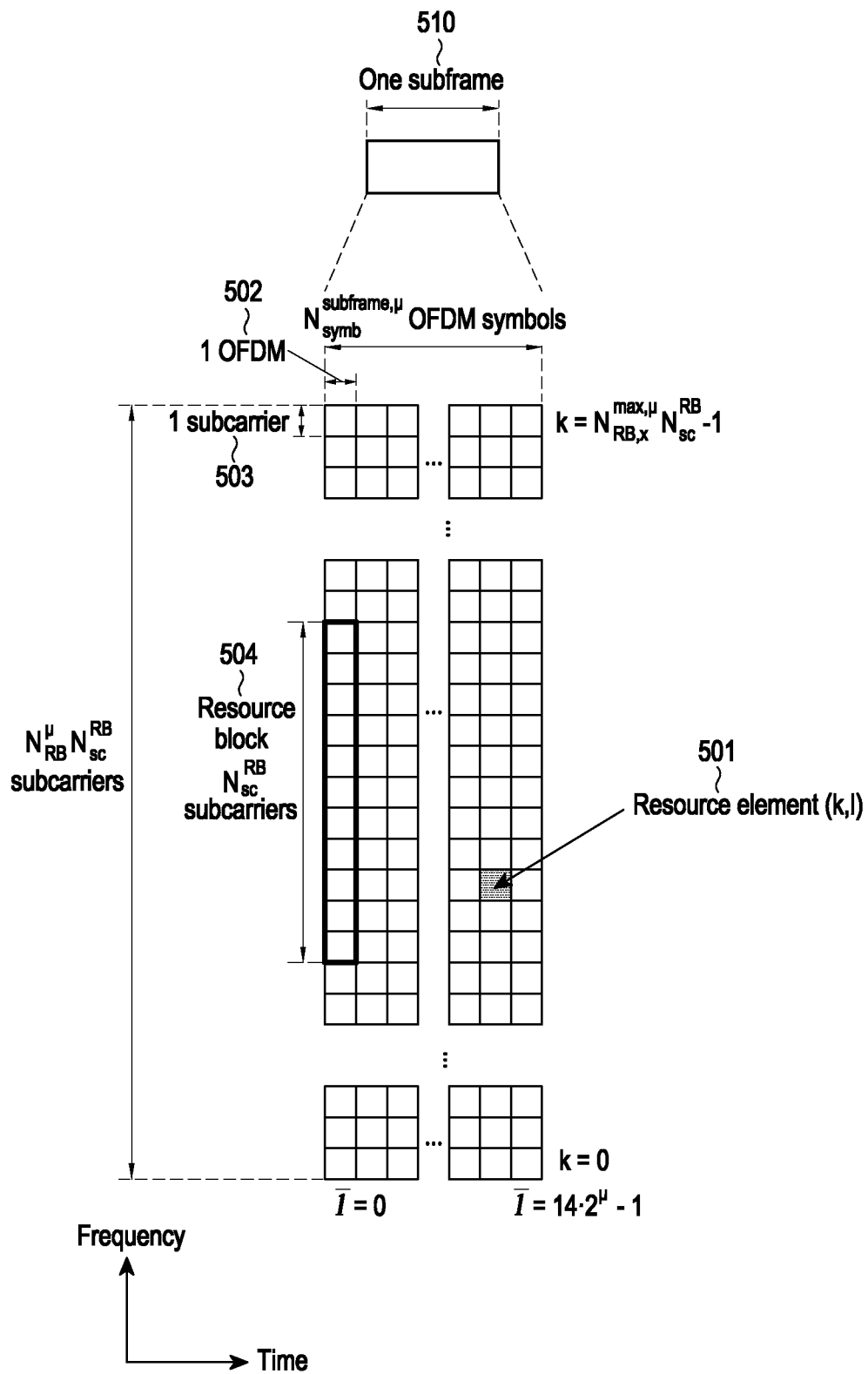
FIG. 5 illustrates a resource structure of a wireless communication system according to various embodiments of the disclosure.

FIG. 5 illustrates a resource structure of a wireless communication system according to various embodiments of the disclosure. Specifically, FIG. 5 illustrates a basic structure of a time-frequency domain, which is a radio resource region where data or control channel channels are transmitted in a 5G system.

In FIG. 5, the horizontal axis refers to the time domain, and the vertical axis refers to the frequency domain. A basic unit of a resource in the time and frequency domain is a resource element (RE) 501, which may be defined by one orthogonal frequency division multiplexing (OFDM) symbol 502 on the time axis, and by one subcarrier 503 on the frequency axis. In the frequency domain, $N_{SC}^{RB}$ (e.g., 12) consecutive REs may constitute one resource block (RB) 504. In FIG. 5, $N_{symb}^{subframe,\mu}$ is the number of OFDM symbols per subframe 510 for subcarrier spacing setting ($\mu$). For a more detailed description of the resource structure used in the 5G system, refer to TS 38.211 section 4 standard.

Figure 6:
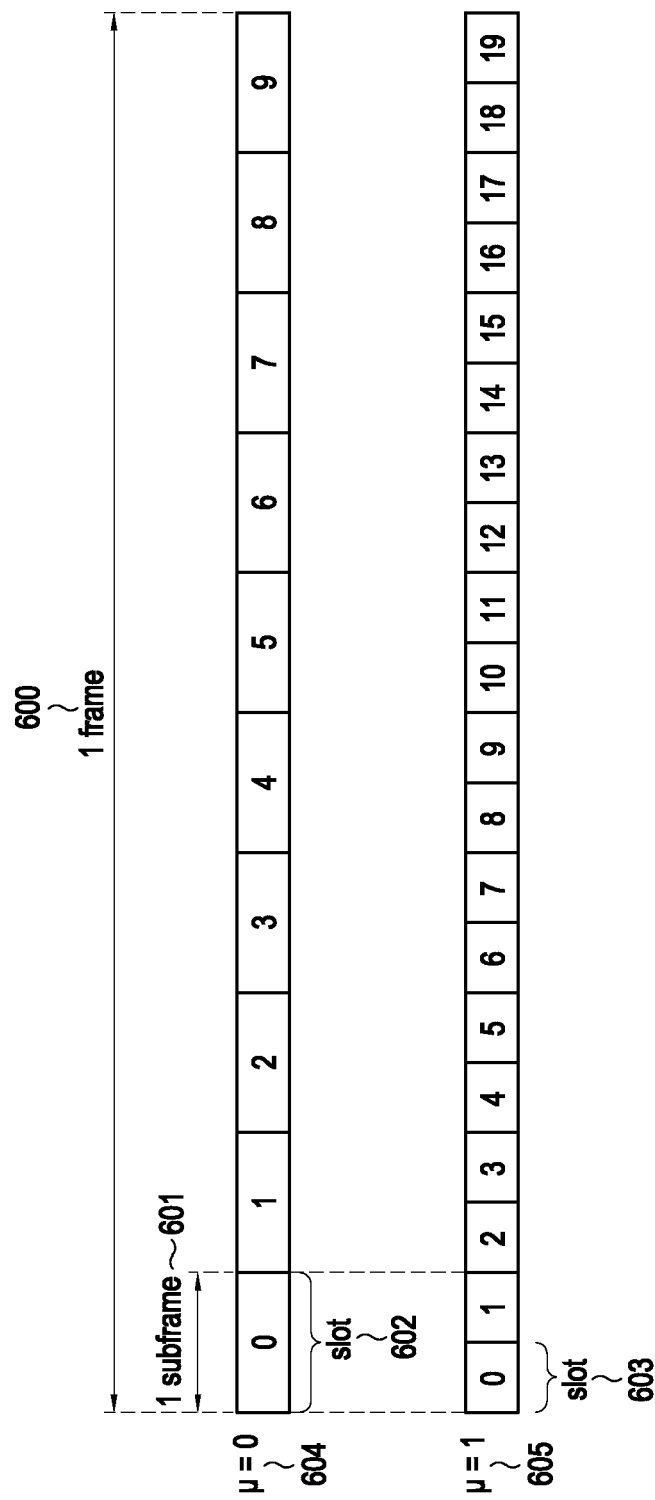
FIG. 6 illustrates a resource structure of a wireless communication system according to various embodiments of the disclosure.

FIG. 6 illustrates a resource structure of a wireless communication system according to various embodiments of the disclosure. Specifically, FIG. 6 illustrates a slot structure considered in the 5G system.

FIG. 6 illustrates an example structure of a frame 600, a subframe 601, and a slot 602. One frame 600 may be defined as 10 ms. One subframe 601 may be defined as 1 ms, and thus, one frame 600 may consist of a total of 10 subframes 601. One slot 602 or 603 may be defined as 14 slot OFDM symbols (that is, the number ($N_{symb}^{slot}$) of symbols per slot=14). One subframe 601 may be composed of one or more slots 602 and 603, and the number of slots 602 and 603 per subframe 601 may differ depending on u (604 or 605), which is a set value for the subcarrier spacing.

FIG. 6 illustrates an example in which the subcarrier spacing setting value $\mu=0$ (604) and an example in which the subcarrier spacing setting value $\mu=1$ (605). When $\mu=0$ (604), one subframe 601 may consist of one slot 602, and when $\mu=1$ (605), one subframe 601 may consist of two slots (603). In other words, according to the set subcarrier spacing value $\mu$, the number ($N_{slot}^{subframe,\mu}$) of slots per subframe may vary, and accordingly, the number ($N_{slot}^{frame,\mu}$) of per frame may differ. According to each subcarrier spacing $\mu$, $N_{slot}^{subframe,\mu}$ and $N_{slot}^{frame,\mu}$ may be defined in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

A configuration of a bandwidth part (BWP) in a 5G communication system is described below in detail with reference to the drawings.

Figure 7:
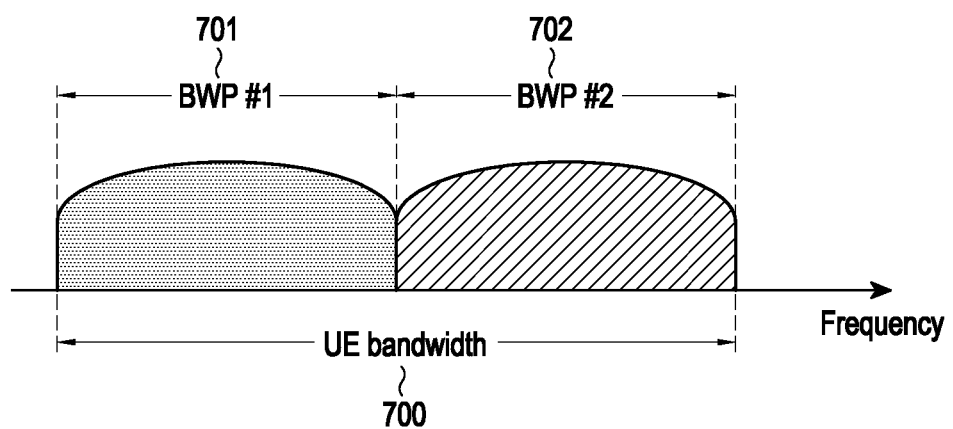
FIG. 7 illustrates a structure of a bandwidth part in a wireless communication system according to various embodiments of the disclosure.

FIG. 7 illustrates a structure of a bandwidth part in a wireless communication system according to various embodiments of the disclosure. Specifically, FIG. 7 is a view illustrating an example of a configuration for a bandwidth part in a 5G communication system.

FIG. 7 illustrates an example in which a UE bandwidth 700 is divided into two bandwidth parts, e.g., bandwidth part #1 (BWP #1) 701 and bandwidth part #2 (BWP #2) 702. The base station may configure one or more bandwidth parts in the UE and, for each bandwidth part, information as illustrated in Table 2 below may be configured.

TABLE 2

| | |
|---|---|
| BWP ::= | SEQUENCE { |
| bwp-Id | BWP-Id, |
| (Bandwidth part identifier) | |
| locationAndBandwidth | INTEGER (1..65336), |
| (Bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

In Table 2, "locationAndBandwidth" denotes the position and bandwidth in the frequency domain of the corresponding bandwidth part, "cyclicPrefix" denotes whether an extended cyclic prefix (CP) is used for the bandwidth part, and "subcarrierSpacing" denotes the subcarrier spacing to be used in the bandwidth part.

Various embodiments of the disclosure are not limited thereto, and other various BWP-related parameters than the above-described configuration information may be configured in the UE. The base station may transfer the information to the UE through higher layer signaling, e.g., radio resource control (RRC) signaling. At least one bandwidth part among one or more configured bandwidth parts may be activated. Whether to activate the configured bandwidth part may be transferred from the base station to the UE semi-statically through RRC signaling or dynamically through downlink control information (DCI).

According to an embodiment, before radio resource control (RRC) connected, the UE may be configured with an initial bandwidth part (BWP) for initial access by the base station via a master information block (MIB). More specifically, the UE may receive configuration information for a search space and control resource set (CORESET) in which physical downlink control channel (PDCCH) may be transmitted to receive system information (remaining system information, RMSI or system information block 1 which may correspond to SIB1) necessary for initial access through the MIB in the initial access phase. The control resource set (CORESET) and search space set through the MIB may be regarded as an identity (ID) 0. The control resource set and the search space configured through the MIB may be a common control resource set and a common search space, respectively. The base station may provide the UE with configuration information, such as frequency allocation information, time allocation information, and numerology for control resource set #0, via the MIB. Further, the base station may provide the UE with configuration information for paging occasion and monitoring period for control resource set #0, i.e., configuration information for search space #0, via the MIB. The UE may regard the frequency range set as control resource set #0 obtained from the MIB, as the initial BWP for initial access. In this case, the identity (ID) of the initial BWP may be regarded as 0.

The configuration of the bandwidth part supported in 5G described above may be used for various purposes.

According to an embodiment, when the bandwidth supported by the UE is smaller than the system bandwidth, this may be supported through the bandwidth part configuration. For example, as the base station configures the UE with the frequency position of the bandwidth part, the UE may transmit/receive data in a specific frequency position in the system bandwidth.

According to an embodiment, for the purpose of supporting different numerologies, the base station may configure the UE with a plurality of bandwidth parts. For example, to support data transmission/reception using a subcarrier spacing of 15 kHz and a subcarrier spacing of 30 kHz for some UE, the base station may configure the UE with two bandwidths, as subcarrier spacings of 15 kHz and 30 kHz. The different bandwidth parts may be frequency division multiplexed and, when data is transmitted/received at a specific subcarrier spacing, the bandwidth part set as the corresponding subcarrier spacing may be activated.

According to an embodiment, for the purpose of reducing power consumption of the UE, the base station may configure the UE with bandwidth parts having different sizes of bandwidths. For example, when the UE supports a bandwidth exceeding a very large bandwidth, e.g., a bandwidth of 100 MHz, and transmits/receives data always using the bandwidth, significant power consumption may occur. In particular, it is very inefficient in terms of power consumption to monitor an unnecessary downlink control channel using a large bandwidth of 100 MHz in a situation where there is no traffic. For the purpose of reducing power consumption of the UE, the base station may configure a bandwidth part of a relatively small bandwidth to the UE, e.g., a bandwidth part of 20 MHz, in the UE. In a no-traffic situation, the UE may perform monitoring in the 20 MHz bandwidth and, if data occurs, the UE may transmit/receive data in the 100 MHz bandwidth according to an instruction from the base station.

In a method for configuring a bandwidth part, UEs before RRC connected may receive configuration information for an initial bandwidth via a master information block (MIB) in the initial access phase. More specifically, the UE may be configured with a control resource set (CORESET) for the downlink control channel where the downlink control information (DCI) scheduling the system information block (SIB) may be transmitted from the MIB of the physical broadcast channel (PBCH). The bandwidth of the control resource set configured through the MIB may be regarded as the initial bandwidth part, and the UE may receive the physical downlink shared channel (PDSCH), which transmits the SIB, via the configured initial bandwidth part. The initial bandwidth part may be utilized for other system information (OSI), paging, and random access as well as for receiving SIB.

If the UE is configured with one or more bandwidth parts, the base station may indicate, to the UE, a change in bandwidth part using the bandwidth part indicator in the DCI. As an example, when the currently activated bandwidth part of the UE is bandwidth part #1 701 in FIG. 7, the base station may indicate, to the UE, bandwidth part #2 702 with the bandwidth part indicator in the DCI, and the UE may change the bandwidth part to bandwidth part #2 702, indicated with the bandwidth part indicator in the received DCI.

As described above, since DCI-based bandwidth part changing may be indicated by the DCI scheduling physical downlink shared channel (PDSCH) or physical uplink shared channel (PUSCH), the UE, if receiving a bandwidth part change request, is supposed to be able to receive or transmit the PDSCH or PUSCH, scheduled by the DCI, in the changed bandwidth part without trouble. To that end, the standard specified requirements for delay time $T_{BWP}$ required upon changing bandwidth part, which may be defined as shown in Table 3 below.

TABLE 3

| μ | NR Slot length (ms) | BWP switch delay $T_{BWP}$ (slots) | |
| --- | --- | --- | --- |
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirement for delay of bandwidth part change supports type 1 or type 2 according to the capability of the UE. The UE may report a supportable bandwidth part delay time type to the base station.

If the UE receives, in slot n, DCI including a bandwidth part change indicator according to the above-described requirements for bandwidth part change delay time, the UE may complete a change to the new bandwidth part, indicated by the bandwidth part change indicator, at a time not later than slot $n+T_{BWP}$, and may perform transmission/reception on the data channel scheduled by the DCI in the changed, new bandwidth part. Upon scheduling data channel in the new bandwidth part, the base station may determine time domain resource allocation for data channel considering the UE's bandwidth part change delay time $T_{BWP}$. In other words, when scheduling a data channel with the new bandwidth part, in a method for determining a time domain resource allocation for the data channel, the base station may schedule a corresponding data channel after the bandwidth part change delay time. Thus, the UE may not expect that the DCI indicating the bandwidth part change indicates a slot offset (K0 or K2) smaller than the bandwidth part change delay time $T_{BWP}$.

If the UE has received the DCI (e.g., DCI format 1_1 or 0_1) indicating the bandwidth part change, the UE may perform no transmission or reception during the time period from the third symbol of the slot in which the PDCCH including the DCI has been received to the start point of the slot indicated by the slot offset (K0 or K2) value indicated by the time domain resource allocation indicator field in the DCI. For example, if the UE receives the DCI indicating a bandwidth part change in slot n, and the slot offset value indicated by the DCI is K, the UE may perform no transmission or reception from the third symbol of slot n to a symbol before slot n+K (i.e., the last symbol of slot n+K−1).

Next, a synchronization signal (SS)/PBCH block (i.e., a synchronization signal block (SSB)) in 5G is described.

The SS/PBCH block may mean a physical layer channel block composed of primary SS (PSS), secondary SS (SSS), and physical broadcast channel (PBCH). Specifically, the configuration of the SS/PBCH block is as follows.

PSS: A signal that serves as a reference for downlink time/frequency synchronization and provides part of the information for cell ID SSS: serves as a reference for downlink time/frequency synchronization, and provides the rest of the information for cell ID, which PSS does not provide. Additionally, it may serve as a reference signal for demodulation of PBCH.

PBCH: provides essential system information necessary for the UE to transmit and receive data channel and control channel. The essential system information may include search space-related control information indicating radio resource mapping information for a control channel and scheduling control information for a separate data channel for transmitting system information.

The SS/PBCH block is composed of a combination of PSS, SSS, and PBCH. One or more SS/PBCH blocks may be transmitted within 5 ms, and each transmitted SS/PBCH block may be distinguished with an index.

The UE may detect the PSS and SSS in the initial access phase and may decode the PBCH. The UE may obtain the MIB from the PBCH and be therefrom configured with control resource set (CORESET) #0 (which may correspond to the control resource set whose control resource set index or identity (ID) is 0) and search space #0 (which may correspond to the search space whose search space index or ID is 0). The UE may perform monitoring on control resource set #0, assuming that the selected SS/PBCH block and the demodulation reference signal (DMRS) transmitted in control resource set #0 are quasi-co-located (QCLed). The UE may receive system information through the downlink control information transmitted in control resource set #0. The UE may obtain configuration information related to random access channel (RACH) required for initial access from the received system information. The UE may transmit the physical RACH (PRACH) to the base station considering the selected SS/PBCH index, and the base station receiving the PRACH may obtain information for the SS/PBCH block index selected by the UE. The base station may know which block the UE has selected from the SS/PBCH blocks and monitors control resource set #0 related thereto.

Next, downlink control information (DCI) in the 5G system is described in detail.

Scheduling information for uplink data (or physical uplink shared channel (PUSCH) or downlink data (or physical downlink data channel (PDSCH) in the 5G system is transmitted from the base station through DCI to the UE. The UE may monitor the DCI format for fallback and the DCI format for non-fallback for PUSCH or PDSCH. The fallback DCI format may be composed of fixed fields predefined between the base station and the UE, and the non-fallback DCI format may include configurable fields.

DCI may be transmitted through the PDCCH, which is a physical downlink control channel, via channel coding and modulation. A cyclic redundancy check (CRC) is added to the DCI message payload, and the CRC is scrambled with the radio network temporary identifier (RNTI) that is the identity of the UE. Different RNTIs may be used for the purposes of the DCI, e.g., UE-specific data transmission, power control command, or random access response. In other words, the RNTI is not explicitly transmitted, but the RNTI is included in the CRC calculation process and transmitted. Upon receiving the DCI transmitted on the PDCCH, the UE identifies the CRC using the allocated RNTI, and when the CRC is correct, the UE may be aware that the DCI has been transmitted to the UE.

For example, DCI scheduling a PDSCH for system information (SI) may be scrambled to SI-RNTI. The DCI scheduling a PDSCH for a random access response (RAR) message may be scrambled to RA-RNTI. DCI scheduling a PDSCH for a paging message may be scrambled with P-RNTI. The DCI providing a slot format indicator (SFI) may be scrambled to SFI-RNTI. The DCI providing transmit power control (TPC) may be scrambled to TPC-RNTI. DCI scheduling UE-specific PDSCH or PUSCH may be scrambled with the cell RNTI (C-RNTI), modulation coding scheme C-RNTI (MCS-C-RNTI), or configured scheduling RNTI (CS-RNTI).

DCI format 0_0 may be used as fallback DCI for scheduling PUSCH, and in this case, CRC may be scrambled to C-RNTI. DCI format 0_0 in which CRC is scrambled to C-RNTI may include, e.g., the information shown in Table 4 below.

TABLE 4

- Identifier for DCI formats - 1 bit
  - The value of this bit field is always set to 0, indicating an UL DCI format
- Frequency domain resource assignment - $\lceil \log_2(N_{RB}^{UL, BWP}(N_{RB}^{UL, BWP} + 1)/2) \rceil$ bits where $N_{RB}^{UL, BWP}$ is defined in clause 7.3.1.0
  - For PUSCH hopping with resource allocation type 1:
    - $N_{UL, hop}$ MSB bits are used to indicate the frequency offset according to Clause 6.3 of [6, TS 38.214], where $N_{UL, hop}$ = 1 if the higher layer parameter frequencyHoppingOffsetLists contains two offset values and $N_{UL, hop}$ = 2 if the higher layer parameter frequencyHoppingOffsetLists contains four offset values
    - $\lceil \log_2(N_{RB}^{UL, BWP}(N_{RB}^{UL, BWP} + 1)/2) \rceil - N_{UL, hop}$ bits provides the frequency domain resource allocation according to Clause 6.1.2.2.2 of [6, TS 38.214]
    - For non-PUSCH hopping with resource allocation type 1:
    - $\lceil \log_2(N_{RB}^{UL, BWP}(N_{RB}^{UL, BWP} + 1)/2) \rceil$ bits provides the frequency domain resource allocation according to Clause 6.1.2.2.2 of [6, TS 38.214]
- Time domain resource assignment - 4 bits as defined in Clause 6.1.2.1 of [6, TS 38.214]
- Frequency hopping flag - 1 bit according to Table 7.3.1.1.1-3, as defined in Clause 6.3 of [6, TS 38.214]
- Modulation and coding scheme - 5 bits as defined in Clause 6.1.4.1 of [6, TS 38.214]
- New data indicator - 1 bit
- Redundancy version - 2 bits as defined in Table 7.3.1.1.1-2
- HARQ process number - 4 bits
- TPC command for scheduled PUSCH - 2 bits as defined in Clause 7.1.1 of [5, TS 38.213]
- Padding bits, if required.
- UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding: 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
  - If the UL/SUL indicator is not present in DCI format 0_0 and pucch-Config is configured, the corresponding PUSCH scheduled by the DCI format 0_0 is for the UL or SUL for which high layer parameter pucch-Config is configured.
  - If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as non-fallback DCI for scheduling PUSCH, and in this case, CRC may be scrambled to C-RNTI. DCI format 0_1 in which CRC is scrambled to C-RNTI may include, e.g., the information shown in Table 5a and Table 5b below. Table 5a to Table 5d show a series of fields (information) included in DCI format 0_1 separated for convenience.

TABLE 5a

- Identifier for DCI formats - 1 bit
  - The value of this bit field is always set to 0, indicating an UL DCI format
- Carrier indicator - 0 or 3 bits, as defined in Subclause 10.1 of [5, TS38.213].
- UL/SUL indicator - 0 bit for UEs not configured with supplementaryUplink in ServingCellConfig in the cell or UEs configured with supplementaryUplink in ServingCellConfig in the cell but only one carrier in the cell is configured for PUSCH transmission; otherwise, 1 bit as defined in Table 7.3.1.1.1-1.
- Bandwidth part indicator - 0, 1 or 2 bits as determined by the number of UL BWPs $n_{BWP, RRC}$ configured by higher layers, excluding the initial UL bandwidth part. The bitwidth for this field is determined as $\lceil \log_2(n_{BWP}) \rceil$ bits, where
  - $n_{BWP} = n_{BWP, RRC} + 1$ if $n_{BWP, RRC} \leq 3$, in which case the bandwidth part indicator is equivalent to the ascending order of the higher layer parameter BWP-Id;
  - otherwise $n_{BWP} = n_{BWP, RRC}$, in which case the bandwidth part indicator is defined in Table 7.3.1.1.2-1;
  If a UE does not support active BWP change via DCI, the UE ignores this bit field.
- Frequency domain resource assignment - number of bits determined by the following, where $N_{RB}^{UL, BWP}$ is the size of the active UL bandwidth part:
  - $N_{RBG}$ bits if only resource allocation type 0 is configured, where $N_{RBG}$ is defined in Subclause 6.1.2.2.1 of [6, TS 38.214],
  - $\lceil \log_2(N_{RB}^{UL, BWP}(N_{RB}^{UL, BWP} + 1)/2) \rceil$ bits if only resource allocation type 1 is configured, or
  - max ($\lceil \log_2(N_{RB}^{UL, BWP}(N_{RB}^{UL, BWP} + 1)/2) \rceil$, $N_{RBG}$) + 1 bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 6.1.2.2.1 of [6, TS 38.214].

TABLE 5a-continued

- For resource allocation type 1, the $\lceil \log_2(N_{RB}^{UL,\ BWP}(N_{RB}^{UL,\ BWP} + 1)/2) \rceil$ LSBs provide the resource allocation as follows:
  - For PUSCH hopping with resource allocation type 1:
    - $N_{UL,\ hop}$ MSB bits are used to indicate the frequency offset according to Subclause 6.3 of [6, TS 38.214], where $N_{UL,\ hop} = 1$ if the higher layer parameter frequencyHoppingOffsetLists contains two offset values and $N_{UL,\ hop} = 2$ if the higher layer parameter frequencyHoppingOffsetLists contains four offset values
    - $\lceil \log_2(N_{RB}^{UL,\ BWP}(N_{RB}^{UL,\ BWP} + 1)/2) \rceil - N_{UL,\ hop}$ bits provides the frequency domain resource allocation according to Subclause 6.1.2.2.2 of [6, TS 38.214]
  - For non-PUSCH hopping with resource allocation type 1:
    - $\lceil \log_2(N_{RB}^{UL,\ BWP}(N_{RB}^{UL,\ BWP} + 1)/2) \rceil$ bits provides the frequency domain resource allocation according to Subclause 6.1.2.2.2 of [6, TS 38.214]
- If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

TABLE 5b

- Time domain resource assignment – 0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
- Frequency hopping flag – 0 or 1 bit:
  - 0 bit if only resource allocation type 0 is configured or if the higher layer parameter frequencyHopping is not configured;
  - 1 bit according to Table 7.3.1.1.1-3 otherwise, only applicable to resource allocation type 1, as defined in Subclause 6.3 of [6, TS 38.214].
- Modulation and coding scheme – 5 bits as defined in Subclause 6.1.4.1 of [6, TS 38.214]
- New data indicator – 1 bit
- Redundancy version – 2 bits as defined in Table 7.3.1.1.1-2
- HARQ process number – 4 bits
- 1$^{st}$ downlink assignment index – 1 or 2 bits:
  - 1 bit for semi-static HARQ-ACK codebook;
  - 2 bits for dynamic HARQ-ACK codebook.
- 2$^{nd}$ downlink assignment index – 0 or 2 bits:
  - 2 bits for dynamic HARQ-ACK codebook with two HARQ-ACK sub-codebooks;
  - 0 bit otherwise.
- TPC command for scheduled PUSCH – 2 bits as defined in Subclause 7.1.1 of [5, TS38.213]
- SRS resource indicator – $\left\lceil \log_2\left( \sum_{k=1}^{\min\{L_{max},N_{SRS}\}} \binom{N_{SRS}}{k} \right) \right\rceil$ or $\lceil \log_2(N_{SRS}) \rceil$ bits, where $N_{SRS}$ is the number of configured SRS resources in the SRS resource set associated with the higher layer parameter usage of value 'codebook' or 'noncodeBook',
- $\left\lceil \log_2\left( \sum_{k=1}^{\min\{L_{max},N_{SRS}\}} \binom{N_{SRS}}{k} \right) \right\rceil$ bits according to Tables 7.3.1.1.2-28/29/30/31 if the higher layer parameter txConfig = nonCodebook, where $N_{SRS}$ is the number of configured SRS resources in the SRS resource set associated with the higher layer parameter usage of value 'noncodeBook' and
  - if UE supports operation with maxMIMO-Layers and the higher layer parameter maxMIMO-Layers of PUSCH-ServingCellConfig of the serving cell is configured, $L_{max}$ is given by that parameter
  - otherwise, $L_{max}$ is given by the maximum number of layers for PUSCH supported by the UE for the serving cell for non-codebook based operation.
- $\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codebook'.
- Precoding information and number of layers – number of bits determined by the following:
  - 0 bits if the higher layer parameter txConfig = nonCodeBook;
  - 0 bits for 1 antenna port and if the higher layer parameter txConfig = codebook;

TABLE 5c

- 4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;
- 2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset;
- 2 or 4 bits according to Table7.3.1.1.2-4 for 2 antenna ports, if txConfig = codebook, and according to whether transform precoder is enabled or disabled, and the values of higher layer parameters maxRank and codebookSubset;
- 1 or 3 bits according to Table7.3.1.1.2-5 for 2 antenna ports, if txConfig = codebook, and according to whether transform precoder is enabled or disabled, and the values of higher layer parameters maxRank and codebookSubset.
- Antenna ports - number of bits determined by the following
  - 2 bits as defined by Tables 7.3.1.1.2-6, if transform precoder is enabled, dmrs-Type = 1, and maxLength = 1;
  - 4 bits as defined by Tables 7.3.1.1.2-7, if transform precoder is enabled, dmrs-Type = 1, and maxLength = 2;
  - 3 bits as defined by Tables 7.3.1.1.2-8/9/10/11, if transform precoder is disabled, dmrs-Type = 1, and maxLength = 1, and the value of rank is determined according to the SRS resource indicator field if the higher layer parameter txConfig = nonCodebook and according to the Precoding information and number of layers field if the higher layer parameter txConfig = codebook;
  - 4 bits as defined by Tables 7.3.1.1.2-12/13/14/15, if transform precoder is disabled, dmrs-Type = 1, and maxLength = 2, and the value of rank is determined according to the SRS resource indicator

TABLE 5c-continued field if the higher layer parameter txConfig = nonCodebook and according to the Precoding
information and number of layers field if the higher layer parameter txConfig = codebook;
- 4 bits as defined by Tables 7.3.1.1.2-16/17/18/19, if transform precoder is disabled, dmrs-Type = 2,
  and maxLength = 1, and the value of rank is determined according to the SRS resource indicator
  field if the higher layer parameter txConfig = nonCodebook and according to the Precoding
  information and number of layers field if the higher layer parameter txConfig = codebook;
- 5 bits as defined by Tables 7.3.1.1.2-20/21/22/23, if transform precoder is disabled, dmrs-Type=2,
  and maxLength = 2, and the value of rank is determined according to the SRS resource indicator
  field if the higher layer parameter txConfig = nonCodebook and according to the Precoding
  information and number of layers field if the higher layer parameter txConfig = codebook.
where the number of CDM groups without data of values 1, 2, and 3 in Tables 7.3.1.1.2-6 to
7.3.1.1.2-23 refers to CDM groups {0}, {0, 1}, and {0, 1, 2} respectively.
If a UE is configured with both dmrs-UplinkForPUSCH-MappingTypeA and dmrs-
UplinkForPUSCH-MappingTypeB, the bitwidth of this field equals max $\{x_A, x_B\}$, where $x_A$ is the
"Antenna ports" bitwidth derived according to dmrs-UplinkForPUSCH-MappingTypeA and $x_B$ is
the "Antenna ports" bitwidth derived according to dmrs-UplinkForPUSCH-MappingTypeB. A
number of $|x_A - x_B|$ zeros are padded in the MSB of this field, if the mapping type of the PUSCH
corresponds to the smaller value of $x_A$ and $x_B$.
- SRS request - 2 bits as defined by Table 7.3.1.1.2-24 for UEs not configured with
  supplementaryUplink in ServingCellConfig in the cell; 3 bits for UEs configured with
  supplementaryUplink in ServingCellConfig in the cell where the first bit is the non-SUL/SUL
  indicator as defined in Table 7.3.1.1.1-1 and the second and third bits are defined by Table 7.3.1.1.2-
  24. This bit field may also indicate the associated CSI-RS according to Subclause 6.1.1.2 of [6, TS
  38.214].

TABLE 5d

- CSI request - 0, 1, 2, 3, 4, 5, or 6 bits determined by higher layer parameter reportTriggerSize.
- CBG transmission information (CBGTI) - 0 bit if higher layer parameter
  codeBlockGroupTransmission for PUSCH is not configured, otherwise, 2, 4, 6, or 8 bits determined
  by higher layer parameter maxCodeBlockGroupsPerTransportBlock for PUSCH.
- PTRS-DMRS association - number of bits determined as follows
  - 0 bit if PTRS-UplinkConfig is not configured and transform precoder is disabled, or if transform
    precoder is enabled, or if maxRank = 1;
  - 2 bits otherwise, where Table 7.3.1.1.2-25 and 7.3.1.1.2-26 are used to indicate the association
    between PTRS port(s) and DMRS port(s) for transmission of one PT-RS port and two PT-RS
    ports respectively. and the DMRS ports are indicated by the Antenna ports field.
  If "Bandwidth part indicator" field indicates a bandwidth part other than the active bandwidth part
  and the "PTRS-DMRS association" field is present for the indicated bandwidth part but not present
  for the active bandwidth part, the UE assumes the "PTRS-DMRS association" field is not present for
  the indicated bandwidth part.
- beta_offset indicator - 0 if the higher layer parameter betaOffsets = semiStatic; otherwise 2 bits as
  defined by Table 9.3-3 in [5, TS 38.213].
- DMRS sequence initialization - 0 bit if transform precoder is enabled; 1 bit if transform precoder is
  disabled.
- UL-SCH indicator - 1 bit. A value of "1" indicates UL-SCH shall be transmitted on the PUSCH and
  a
  value of "0" indicates UL-SCH shall not be transmitted on the PUSCH. Except for DCI format 0_1
  with CRC scrambled by SP-CSI-RNTI, a UE is not expected to receive a DCI format 0_1 with UL-
  SCH indicator of "0" and CSI request of all zero(s).

DCI format 1_0 may be used as fallback DCI for scheduling PDSCH, and in this case, CRC may be scrambled to C-RNTI. DCI format 1_0 in which CRC is scrambled to C-RNTI may include, e.g., the information shown in Table 6 below.

TABLE 6

- Identifier for DCI formats - 1 bits
  - The value of this bit field is always set to 1. indicating a DL DCI format
- Frequency domain resource assignment - $\lceil \log_2(N_{RB}^{DL,\,BWP}(N_{RB}^{DL,\,BWP} + 1)/2 \rceil$ bits where $N_{RB}^{DL,\,BWP}$ is
  given by subclause 7.3.1.0
If the CRC of the DCI format 1_0 is scrambled by C-RNTI and the "Frequency domain resource
assignment" field are of all ones, the DCI format 1_0 is for random access procedure initiated by a
PDCCH order, with all remaining fields set as follows:
- Random Access Preamble index - 6 bits according to ra-PreambleIndex in Subclause 5.1.2 of [8,
  TS38.321]
- UL/SUL indicator - 1 bit. If the value of the "Random Access Preamble index" is not all zeros and if
  the UE is configured with supplementaryUplink in ServingCellConfig in the cell, this field indicates
  which UL carrier in the cell to transmit the PRACH according to Table 7.3.1. 1. 1-1; otherwise, this
  field is reserved TABLE 6-continued

- SS/PBCH index - 6 bits. If the value of the "Random Access Preamble index" is not all zeros, this
  field indicates the SS/PBCH that shall be used to determine the RACH occasion for the PRACH
  transmission; otherwise, this field is reserved.
- PRACH Mask index - 4 bits. If the value of the "Random Access Preamble index" is not all zeros,
  this field indicates the RACH occasion associated with the SS/PBCH indicated by "SS/PBCH index"
  for the PRACH transmission, according to Subclause 5.1.1 of [8, TS38.321 ]; otherwise, this field is
  reserved
- Reserved bits - 10 bits
Otherwise, all remaining fields are set as follows:
- Time domain resource assignment - 4 bits as defined in Subclause 5.1.2. 1 of [6, TS 38.214]
- VRB-to-PRB mapping - 1 bit according to Table 7.3.1.2.2-5
- Modulation and coding scheme - 5 bits as defined in Subclause 5.1.3 of [6, TS 38.214|
- New data indicator - 1 bit
- Redundancy version - 2 bits as defined in Table 7.3.1.1.1-2
- HARQ process number - 4 bits
- Downlink assignment index - 2 bits as defined in Subclause 9.1.3 of [5, TS 38.213], as counter DAI
- TPC command for scheduled PUCCH - 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 3 bits as defined in Subclause 9.2.3 of [5, TS38.213]

DCI format 1_1 may be used as non-fallback DCI for scheduling PDSCH, and in this case, CRC may be scrambled to C-RNTI. DCI format 1_1 in which CRC is scrambled to C-RNTI may include, e.g., the information shown in Table 7a to Table 7c below. Table 7a to Table 7c show a series of fields (information) included in DCI format 1_1 separated for convenience.

TABLE 7a

- Identifier for DCI formats - 1 bit
  - The value of this bit field is always set to 1, indicating an DL DCI format
- Carrier indicator - 0 or 3 bits as defined in Subclause 10.1 of [5, TS 38.213].
- Bandwidth part indicator - 0, 1 or 2 bits as determined by the number of DL BWPs $n_{BWP, RRC}$
  configured by higher layers, excluding the initial DL bandwidth part. The bitwidth for this field is
  determined as $\lceil \log_2(n_{BWP}) \rceil$ bits, where
  - $n_{BWP} = n_{BWP, RRC} + 1$ if $n_{BWP, RRC} \leq 3$, in which case the bandwidth part indicator is equivalent to the
    ascending order of the higher layer parameter BWP-Id;
  - otherwise $n_{BWP} = n_{BWP, RRC}$, in which case the bandwidth part indicator is defined in Table
    7.3.1.1.2-1;
  If a UE does not support active BWP change via DCI, the UE ignores this bit field.
- Frequency domain resource assignment - number of bits determined by the following, where
  $N_{RB}^{DL, BWP}$ is the size of the active DL bandwidth part:
  - $N_{RBG}$ bits if only resource allocation type 0 is configured, where $N_{RBG}$ is defined in Subclause
    5.1.2.2.1 of [6, TS38.214],
  - $\lceil \log_2(N_{RB}^{DL, BWP}(N_{RB}^{DL, BWP} + 1)/2) \rceil$ bits if only resource allocation type 1 is configured, or
  - $\max (\lceil \log_2(N_{RB}^{DL, BWP}(N_{RB}^{DL, BWP} + 1)/2) \rceil, N_{RBG}) + 1$ bits if both resource allocation type 0 and 1
    are configured.
  - If both resource allocation type 0 and 1 are configured, the MSB bit is used to indicate resource
    allocation type 0 or resource allocation type 1, where the bit value of 0 indicates resource
    allocation type 0 and the bit value of 1 indicates resource allocation type 1.
  - For resource allocation type 0, the $N_{RBG}$ LSBs provide the resource allocation as defined in
    Subclause 5.1.2.2.1 of [6, TS 38.214].
  - For resource allocation type 1, the $\lceil \log_2(N_{RB}^{DL, BWP}(N_{RB}^{DL, BWP} + 1)/2) \rceil$ LSBs provide the resource
    allocation as defined in Subclause 5.1.2.2.2 of [6, TS 38.214]
  If "Bandwidth part indicator" field indicates a bandwidth part other than the active bandwidth part
  and if both resource allocation type 0 and 1 are configured for the indicated bandwidth part, the UE
  assumes resource allocation type 0 for the indicated bandwidth part if the bitwidth of the "Frequency
  domain resource assignment" field of the active bandwidth part is smaller than the bitwidth of the
  "Frequency domain resource assignment" field of the indicated bandwidth part.
- Time domain resource assignment - 0, 1, 2, 3, or 4 bits as defined in Subclause 5.1.2.1 of [6, TS
  38.214]. The bitwidth for this field is determined as $\lceil \log_2(I) \rceil$ bits, where I is the number of entries in
  the higher layer parameter pdsch-TimeDomainAllocationList if the higher layer parameter is
  configured; otherwise I is the number of entries in the default table.
- VRB-to-PRB mapping - 0 or 1 bit:
  - 0 bit if only resource allocation type 0 is configured or if interleaved VRB-to-PRB mapping is not
    configured by high layers;
  - 1 bit according to Table 7.3.1.2.2-5 otherwise, only applicable to resource allocation type 1, as
    defined in Subclause 7.3.1.6 of [4, TS 38.211].
- PRB bundling size indicator - 0 bit if the higher layer parameter prb-BundlingType is not configured
  or is set to 'staticBundling', or 1 bit in the higher layer parameter prb-BundlingType is set to
  'dynamicBundling' according to Subclause 5.1.2.3 of [6, TS 38.214].

TABLE 7b

- Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
- ZP CSI-RS trigger - 0, 1, or 2 bits as defined in Subclause 5.1.4.2 of [6, TS 38.214]. The bitwidth for this field is determined as $\lceil \log_2(N_{ZP} + 1) \rceil$ bits, where $N_{ZP}$ is the number of aperiodic ZP CSI-RS resource sets configured by higher layer.

For transport block 1:
- Modulation and coding scheme - 5 bits as defined in Subclause 5.1.3.1 of [6, TS 38.214]
- New data indicator - 1 bit
- Redundancy version - 2 bits as defined in Table 7.3.1.1.1-2

For transport block 2 (only present if maxNrofCodeWordsScheduledByDCI equals 2):
- Modulation and coding scheme - 5 bits as defined in Subclause 5.1.3.1 of [6, TS 38.214]
- New data indicator - 1 bit
- Redundancy version - 2 bits as defined in Table 7.3.1.1.1-2

If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.

- HARQ process number - 4 bits
- Downlink assignment index - number of bits as defined in the following
  - 4 bits if more than one serving cell are configured in the DL and the higher layer parameter pdsch-HARQ-ACK-Codebook = dynamic, where the 2 MSB bits are the counter DAI and the 2 LSB bits are the total DAI;
  - 2 bits if only one serving cell is configured in the DL and the higher layer parameter pdsch-HARQ-ACK-Codebook = dynamic, where the 2 bits are the counter DAI;
  - 0 bits otherwise.
- TPC command for scheduled PUCCH - 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK.
- Antenna port(s) - 4, 5, or 6 bits as defined by Tables 7.3.1.2.2-1/2/3/4, where the number of CDM groups without data of values 1, 2, and 3 refers to CDM groups $\{0\}$, $\{0, 1\}$, and $\{0, 1, 2\}$ respectively. The antenna ports $\{p_0, \ldots, p_{v-1}\}$ shall be determined according to the ordering of DMRS port(s) given by Tables 7.3.1.2.2-1/2/3/4.

If a UE is configured with both dmrs-DownlinkForPDSCH-MappingTypeA and dmrs-DownlinkForPDSCH-MappingTypeB, the bitwidth of this field equals max $\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.

40

TABLE 7c

- Transmission configuration indication - 0 bit if higher layer parameter tci-PresentInDCI is not enabled; otherwise 3 bits as defined in Subclause 5.1.5 of [6, TS38.214].
  If "Bandwidth part indicator" field indicates a bandwidth part other than the active bandwidth part,
  - if the higher layer parameter tci-PresentInDCI is not enabled for the CORESET used for the PDCCH carrying the DCI format 1_1,
    - the UE assumes tci-PresentInDCI is not enabled for all CORESETs in the indicated bandwidth part;
  - otherwise,
    - the UE assumes tci-PresentInDCI is enabled for all CORESETs in the indicated bandwidth part.
- SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
- CBG transmission information (CBGTI) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
- CBG flushing out information (CBGFI) - 1 bit if higher layer parameter codeBlockGroupFlushIndicator is configured as "TRUE", 0 bit otherwise.
  DMRS sequence initialization - 1 bit.

A method for allocating time domain resources for a data channel in a 5G communication system is described.

The base station may configure the UE with a table for time domain resource allocation information for a physical downlink shared channel (PDSCH) and a physical uplink shared channel (PUSCH) via higher layer signaling (e.g., RRC signaling). For PDSCH, a table including up to maxNrofDL-Allocations=16 entries may be configured and, for PUSCH, a table including up to maxNrofUL-Allocations=16 entries may be configured. The time domain resource allocation information may include, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of reception of PDCCH and the time of transmission of the PUSCH scheduled by the received PDCCH), information for the position and length of the start symbol where the PDSCH or PUSCH is scheduled in the slot, and the mapping type of PDSCH or PUSCH.

For example, information, such as in Table 8 and Table 9 below, may be provided from the base station to the UE through higher layer signaling (e.g., RRC signaling) or L1 signaling (e.g., DCI).

TABLE 8

PDSCH-TimeDomainResourceAllocationList information element

PDSCH-TimeDomainReSourceAllocationList ::=  SEQUENCE  (SIZE(1..maxNrofDL-Allocations)) OF PDSCH-TimeDomainResourceAllocation
PDSCH-TimeDomainResourceAllocation ::=  SEQUENCE {
  k0                                    INTEGER(0..32)
OPTIONAL,  -- Need S
  (PDCCH-to-PDSCH timing, slot unit)
mappingType                             ENUMERATED {typeA, typeB},
  (PDSCH mapping type)
startSymbolAndLength                    INTEGER (0..127)
(start symbol and length of PDSCH)
}

TABLE 9

PUSCH-TImeDomaInResourceAllocation information element

PUSCH-TimeDomainResourceAllocationList ::=  SEQUENCE  (SIZE(1..maxNrofUL-Allocations)) OF PUSCH-TimeDomainResourceAllocation
PUSCH-TimeDomainResourceAllocation ::=  SEQUENCE {
  k2                                    INTEGER(0..32)  OPTIONAL,
-- Need S
  (PDCCH-to-PUSCH timing, slot unit)
  mappingType                           ENUMERATED {typeA, typeB},
  (PUSCH mapping type)
startSymbolAndLength                    INTEGER (0..127)
(start symbol and length of PUSCH)
}

The base station may provide the UE with one of the entries in the table for the time domain resource allocation information via L1 signaling (e.g., DCI) (e.g., it may be indicated with the 'time domain resource allocation' field in the DCI). The UE may obtain time domain resource allocation information for the PDSCH or PUSCH based on the DCI received from the base station.

A method for allocating frequency domain resources for a data channel in a 5G communication system is described.

5G supports two types, e.g., resource allocation type 0 and resource allocation type 1, as methods for indicating frequency domain resource allocation information for the physical downlink shared channel (PDSCH) and the physical uplink shared channel (PUSCH).

Resource Allocation Type 0

RB allocation information may be provided from the base station to the UE in the form of a bitmap for a resource block group (RBG). In this case, the RBG may be composed of a set of contiguous virtual RBs, and the size P of the RBG may be determined based on a value set as a higher layer parameter (rbg-Size) and the bandwidth part size defined in Table 10 below.

TABLE 10

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

For the bandwidth part i whose size is $N^{size}_{BWP,i}$, the total number ($N_{RBG}$) of RBGs may be defined as in Equation 1 below.

$$N_{RBG} = \lceil (N_{BWP}^{size} + (N_{BWP}^{start} \bmod P))/P \rceil,$$

where the size of the first RBG is $RBG_0^{size} = P - N_{BWP,i}^{start} \bmod P$,
the size of the last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and
the sizes of the remaining RBGs are all P.

Each bit in the bitmap with a size of $N_{RBG}$ may correspond to each RBG. The RBGs may be indexed in ascending order of frequency, starting from the position of lowest position of the bandwidth part. For $N_{RBG}$ RBGs in the bandwidth part, RBG #0 to RBG #($N_{RBG}$−1) may be mapped to the MSB to the LSB of the RBG bitmap. When a specific bit value in the bitmap is 1, the UE may determine that an RBG corresponding to the bit value has been assigned and, when the specific bit value in the bitmap is 0, the UE may determine that no RBG is assigned corresponding to the bit value.

Resource Allocation Type 1

RB allocation information may be provided from the base station to the UE, as information for the start position and length for the VRBs contiguously assigned. In this case, interleaving or non-interleaving may be further applied to the contiguously assigned VRBs. The resource allocation field of resource allocation type 1 may be configured with a resource indication value (RIV), and the RIV may be composed of the start position ($RB_{start}$) of the VRBs and the length ($L_{RBs}$) of the contiguously allocated RBs. Specifically, the RIV in the bandwidth part of the $N_{BWP}^{size}$ size may be defined as below.

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size}-1-RB_{start})$ where $L_{RBs} \geq 1$ and shall not exceed $N_{BWP}^{size} - RB_{start}$.

The base station may configure the UE with a resource allocation type through higher layer signaling (e.g., the higher layer parameter resourceAllocation may be set to one of resourceAllocationType0, resourceAllocationType1, or dynamicSwitch). If the UE is configured with both resource allocation types 0 and 1 (or if the higher layer parameter resourceAllocation is set to dynamicSwitch in the same way), it may be indicated whether the bit corresponding to the MSB of the field indicating resource allocation in the DCI format indicating scheduling is resource allocation type 0 or resource allocation type 1, resource allocation information may be indicated via the remaining bits except for the bit corresponding to the most significant bit (MSB) based on the indicated resource allocation type and, based thereupon, the UE may interpret the resource allocation field information for the DCI field. If the UE is configured with either resource allocation type 0 or resource allocation type 1 (or if the higher layer parameter resourceAllocation is set to either resourceAllocationType0 or resourceAllocationType1 in the same manner), resource allocation information may be indicated based on the resource allocation type in which a field is configured indicating the resource allocation in the DCI format indicating scheduling and, based thereupon, the UE may interpret the resource allocation field information for the DCI field.

A downlink control channel in the 5G communication system is described below in greater detail with reference to the drawings.

Figure 8:
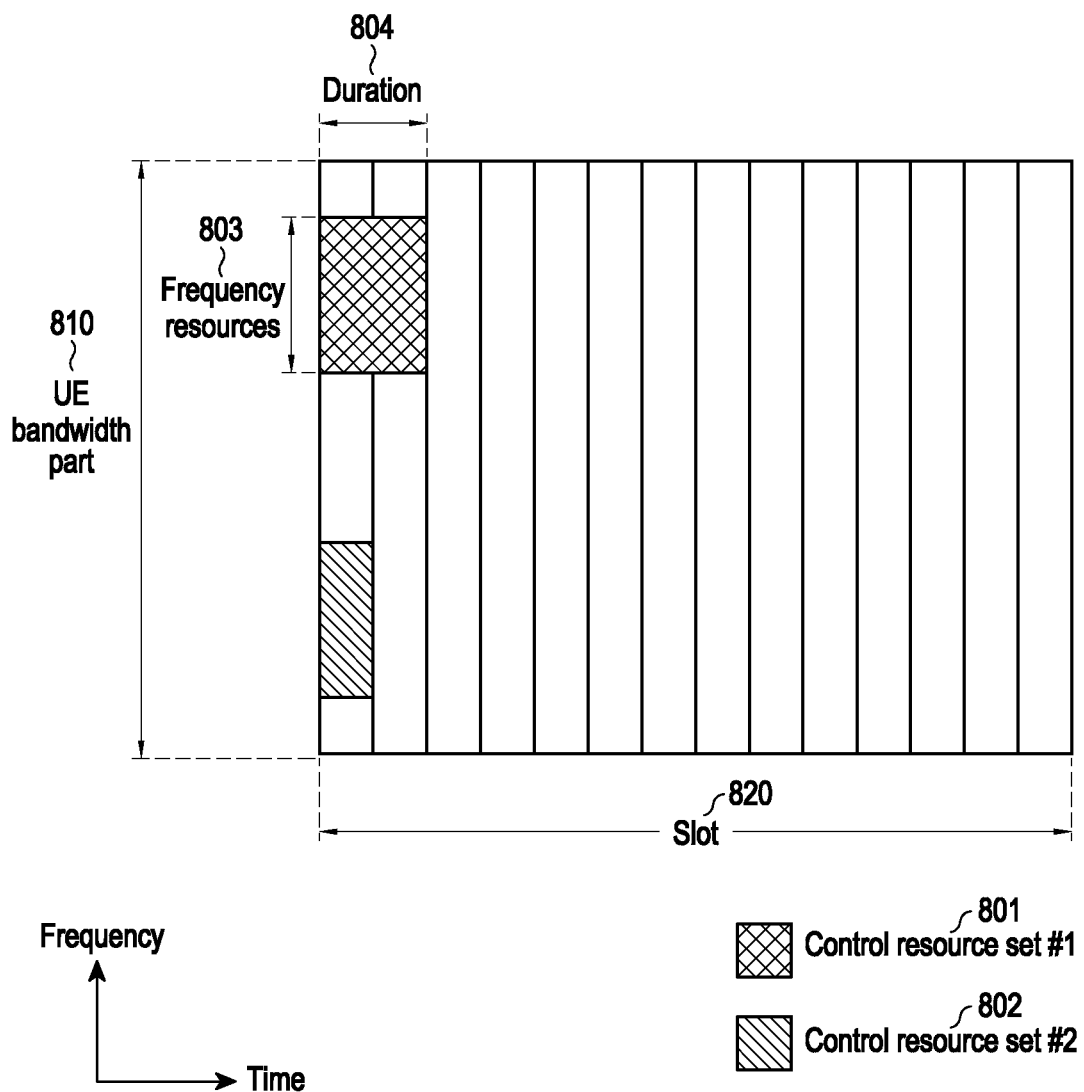
FIG. 8 illustrates a structure of a control resource set in a wireless communication system according to various embodiments of the disclosure.

FIG. 8 illustrates a structure of a control resource set in a wireless communication system according to various embodiments of the disclosure.

Specifically, FIG. 8 illustrates an example of a control resource set (CORESET) where the downlink control channel is transmitted in the 5G wireless communication system. FIG. 8 illustrates an example in which two control resource sets (control resource set #1 801 and control resource set #2 802) are configured in one slot 820 on the time axis, and a UE bandwidth part 810 is configured on the frequency axis. The control resource sets may be configured in specific frequency resources of the overall UE bandwidth part 810 of the UE on the frequency axis. FIG. 8 illustrates that the specific frequency resource 803 is an example of a frequency resource configured in control resource set #1 801.

The control resource set may be configured with one or more OFDM symbols on the time axis, which may be defined as control resource set duration 804.

Referring to FIG. 8, control resource set #1 801 may be configured as a control resource set length of two symbols, and control resource set #2 802 may be configured as a control resource set length of one symbol.

The control resource set in 5G described above may be configured in the UE by the base station through higher layer signaling (e.g., system information, master information block (MIB), or radio resource control (RRC) signaling) or DCI. Configuring a UE with a control resource set means providing the UE with such information as the identifier (ID) of the control resource set, the frequency position of the control resource set, and symbol length of the control resource set. Configuration information for the control resource set may include, e.g., information shown in Table 11 below.

TABLE 11

```
ControlResourceSet ::=                  SEQUENCE {
    -- Corresponds to L1 parameter 'CORESET-ID'
    controlResourceSetId
    ControlResourceSetId,
    (Control Resource Set Identity))
    frequencyDomainResources         BIT STRING (SIZE (45)),
    (Frequency domain resources allocation information)
    duration                         INTEGER
(1..maxCoReSetDuration),
    (Time domain resources allocation information)
        cce-REG-MappingType          CHOICE {
    (CCE-to-REG mapping type)
        interleaved
        SEQUENCE {
            reg-BundleSize
        ENUMERATED {n2, n3, n6},
        (REG bundle size)
            precoderGranularity
        ENUMERATED {sameAsREG-bundle, allContiguousRBs},
            interleaverSize
        ENUMERATED {n2, n3, n6}
            (interleaver size)
            shiftIndex
        INTEGER(0..maxNrofPhysicalResourceBlocks-1)
            OPTIONAL
            (interleaver shift)
        },
        nonInterleaved                NULL
    },
    tci-StatesPDCCH
        SEQUENCE(SIZE (1..maxNrofTCI-StatesPDCCH)) OF TCI-StateId
            OPTIONAL,
    (QCL configuration information)
        tci-PresentInDCI              ENUMERATED
{enabled}
            OPTIONAL,   -- Need S
}
```

In Table 11, tci-StatesPDCCH (simply referred to as transmission configuration indication (TCI) state) configuration information may include information for one or more synchronization signal (SS)/physical broadcast channel (PBCH) block (i.e., synchronization signal block (SSB)) indexes or channel state information reference signal (CSI-RS) index quasi-co-located (QCLed) with the DMRS transmitted in the corresponding control resource set.

Figure 9:
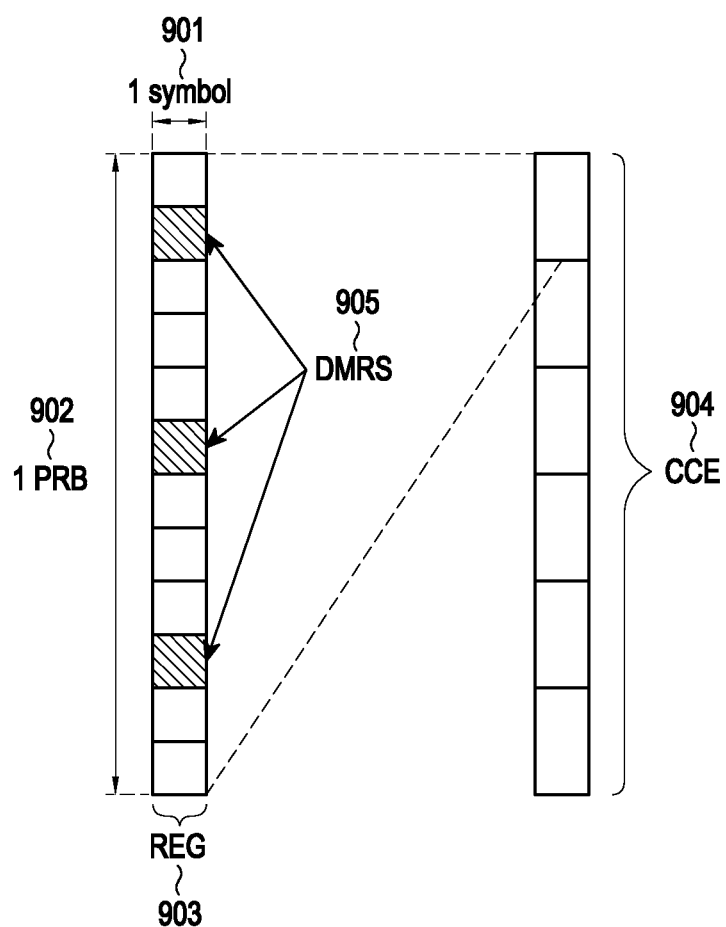
FIG. 9 illustrates a resource structure in a wireless communication system according to various embodiments of the disclosure.

FIG. 9 illustrates a resource structure in a wireless communication system according to various embodiments of the disclosure.

Specifically, FIG. 9 illustrates an example basic unit of time and frequency resources constituting a downlink control channel that may be used in 5G.

Referring to FIG. 9, the basic unit of time and frequency resources constituting the downlink control channel (e.g., PDCCH) may be referred to as a resource element group (REG) 903, and the REG 903 may be defined with one OFDM symbol 901 on the time axis and with one physical resource block (PRB) 902, i.e., 12 subcarriers, on the frequency axis. The base station may configure a downlink control channel allocation unit by concatenating REGs 903.

Referring to FIG. 9, if the basic unit for allocation of a downlink control channel in 5G is a control channel element (CCE) 904, one CCE 904 may be composed of multiple REGs 903. If the REG 903 shown in FIG. 9 is described as an example, the REG 903 may be composed of 12 REs. If one CCE 904 is composed of, e.g., 6 REGs 903, one CCE 904 may be composed of 72 REs. When the downlink control resource set is set, the region may be constituted of multiple CCEs 904, and a particular downlink control channel may be mapped to one or more CCEs 904 according to the aggregation level (AL) in the control resource set and be transmitted. The CCEs 904 in the control resource set are distinguished with numbers, and in this case, the numbers of the CCEs 904 may be assigned according to a logical mapping scheme.

Referring to FIG. 9, the basic unit, i.e., the REG 903, of the downlink control channel may contain REs to which the DCI is mapped and the region to which the DMRS 905, a reference signal for decoding the REs, is mapped. Referring to FIG. 9, three DMRSs 905 may be transmitted in one REG 903, for example. The number of CCEs necessary to transmit a PDCCH may be, e.g., 1, 2, 4, 8, or 16 depending on the aggregation level (AL), and different numbers of CCEs may be used to implement link adaptation of downlink control channel. For example, if AL=L, one downlink control channel may be transmitted via L CCEs. The UE needs to detect a signal while being unaware of information for downlink control channel and, for blind decoding, a search space is defined which indicates a set of CCEs. The search space is a set of candidate control channels constituted of CCEs that the UE needs to attempt to decode on the given aggregation level, and since there are several aggregation levels to bundle up 1, 2, 4, 8, or 16 CCEs, the UE has a plurality of search spaces. A search space set (Set) may be defined as a set of search spaces at all set aggregation levels.

Search spaces may be classified into a common search space and a UE-specific search space. A predetermined group of UEs or all the UEs may search for the common search space of the PDCCH to receive cell-common control information, e.g., paging message, or dynamic scheduling for system information. For example, PDSCH scheduling allocation information for transmitting an SIB containing, e.g., cell service provider information may be received by investigating the common search space of the PDCCH. In the case of the common search space, since a certain group of UEs or all the UEs need receive the PDCCH, it may be defined as a set of CCEs previously agreed on. Scheduling allocation information for the UE-specific PDSCH or PUSCH may be received by inspecting the UE-specific search space of PDCCH. The UE-specific search space may be UE-specifically defined with a function of various system parameters and the identification information (identity) for the UE.

In 5G, the parameters for the search space for the PDCCH may be configured in the UE by the base station through higher layer signaling (e.g., SIB, MIB, or RRC signaling). For example, the base station may configure the UE with, e.g., the number of PDCCH candidates at each aggregation level L, monitoring period for search space, monitoring occasion of symbol unit in slot for search space, search space type (common search space or UE-specific search space), combination of RNTI and DCI format to be monitored in the search space, and control resource set index to be monitored in the search space. For example, configuration information for the search space for the PDCCH may include information as shown in Table 12.

TABLE 12

```
SearchSpace ::=                              SEQUENCE {
    -- Identity of the search space. SearchSpaceId = 0 identifies the
SearchSpace configured via PBCH (MIB) or ServingCellConfigCommon.
    searchSpaceId                            SearchSpaceId,
    (search space ID)
    controlResourceSetId
    ControlResourceSetId,
    (control resource set ID)
    monitoringSlotPeriodicityAndOffset       CHOICE {
    (monitoring slot periodicity and offset)
        sl1
        NULL,
        sl2
        INTEGER (0..1),
        sl4
        INTEGER (0..3),
        sl5
        INTEGER (0..4),
        sl8
        INTEGER (0..7),
        sl10
        INTEGER (0..9),
        sl16
        INTEGER (0..15),
        sl20
        INTEGER (0..19)
    }
                                             OPTIONAL,
    duration(monitoring length)              INTEGER {2..2559}
    monitoringSymbolsWithinSlot              BIT STRING
(SIZE (14))
                OPTIONAL,
    (monitoring symbols within slot)
    nrofCandidates                           SEQUENCE {
    (number of PDCCH candidates per aggregation level)
        aggregationLevel1                    ENUMERATED
{n0, n1, n2, n3, n4, n5, n6, n8},
        aggregationLevel2                    ENUMERATED
{n0, n1, n2, n3, n4, n5, n6, n8},
        aggregationlevel4                    ENUMERATED
{n0, n1, n2, n3, n4, n5, n6, n8},
        aggregationlevel8                    ENUMERATED
{n0, n1, n2, n3, n4, n5, n6, n8},
        aggregationlevel16                   ENUMERATED
{n0, n1, n2, n3, n4, n5, n6, n8}
    },
    searchSpaceType                          CHOICE {
    (search space type)
        -- Configures this search space as common search space (CSS) and
DCI formats to monitor.
        common
        SEQUENCE {
        (common search space)
        }
        ue-Specific
        SEQUENCE {
        (UE-specific search space)
            -- Indicates whether the UE monitors in this USS for DCI
formats 0-0 and 1-0 or for formats 0-1 and 1-1.
            formats
            ENUMERATED {formats0-0-And-1-0, formats0-1-And-1-1},
            ...
        }
```

According to the configuration information, the base station may configure one or more search space sets to the UE. According to an embodiment, the base station may configure the UE with search space set 1 and search space set 2 and configure it to monitor DCI format A, scrambled to X-RNTI in search space set 1, in the common search space and to monitor DCI format B, scrambled to Y-RNTI in search space set 2, in the UE-specific search space. In the X-RNTI and Y-RNTI, "X" and "Y" may correspond to one of various RNTIs to be described below.

According to the above-described configuration information, one or more search space sets may be present in the common search space or the UE-specific search space. For example, search space set #1 and search space set #2 may be configured in the common search space, and search space set #3 and search space set #4 may be configured in the UE-specific search space.

In the common search space, a combination of DCI format and RNTI as follows may be monitored. Of course, various embodiments of the disclosure are not limited to the following examples.

DCI format 0_0/1_0 with CRC scrambled by C-RNTI, CS-RNTI, MCS-C-RNTI, SP-CSI-RNTI, RA-RNTI, TC-RNTI, P-RNTI, or SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, or TPC-PUCCH-RNTI DCI format 2_3 with CRC scrambled by TPC-SRS-RNTI In the UE-specific search space, a combination of DCI format and RNTI as follows may be monitored. Of course, various embodiments of the disclosure are not limited to the following examples.

DCI format 0_0/1_0 with CRC scrambled by C-RNTI, CS-RNTI, or TC-RNTI

DCI format 1_0/1_1 with CRC scrambled by C-RNTI, CS-RNTI, or TC-RNTI

The specified RNTIs may be defined and used as follows.

C-RNTI (Cell RNTI): for scheduling UE-specific PDSCH

Modulation coding scheme C-RNTI (MCS-C-RNTI): for scheduling UE-specific PDSCH

Temporary cell RNTI (TC-RNTI): for scheduling UE-specific PDSCH

Configured scheduling RNTI (CS-RNTI): for scheduling semi-statically configured UE-specific PDSCH Random access RNTI (RA-RNTI): for scheduling PDSCH in the random access phase Paging RNTI (P-RNTI): for scheduling PDSCH where paging is transmitted System information RNTI (SI-RNTI): for scheduling PDSCH where system information is transmitted Interruption RNTI (INT-RNTI): for indicating whether to puncture PDSCH Transmit power control for PUSCH RNTI (TPC-PUSCH-RNTI): for indicating power control command for PUSCH Transmit power control for PUCCH RNTI (TPC-PUCCH-RNTI): for indicating power control command for PUCCH Transmit power control for SRS RNTI (TPC-SRS-RNTI): for indicating power control command for SRS The above-described DCI formats may follow the definitions in Table 13 below.

TABLE 13

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 13-continued

| DCI format | Usage |
|---|---|
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be expressed by Equation 1 below.

$$L \cdot \left\{ \left( Y_{p,n_{s,f}^\mu} + \left\lfloor \frac{(m_{s,n_{CI}} \cdot N_{CCE,p})}{(L \cdot M_{p,s,max}^{(L)})} \right\rfloor + n_{CI} \right) \mod \left\lfloor \frac{N_{CCE,p}}{L} \right\rfloor \right\} + i \quad \text{[Equation 1]}$$

L: aggregation level $n_{CI}$: carrier index $N_{CCE,p}$: the total number of CCEs present in control resource set p $n_{s,f}^\mu$: slot index $M_{p,s,max}^{(L)}$: number of PDCCH candidates of aggregation level L $m_{s,n_{CI}}=0, M_{p,s,max}^{(L)}-1$: PDCCH candidate index of aggregation level L i=0, . . . , L−1

$Y_{p,n_{s,f}^\mu}=(A_p \cdot Y_{p,n_{s,f}^\mu}-1) \mod D$, $Y_p-1=n_{RNTI} \neq 0$, $A_0=39827, A_1=39829, A_2=39839, D=65537$ $n_{RNTI}$: UE identifier Y_(p,n$^\mu$s,f) may be 0 in the case of the common search space.

In the case of the UE-specific search space, Y_(p,n$^\mu$s,f) may be a value that changes depending on the UE's identity (C-RNTI or ID configured in the UE by the base station) and the time index.

Figure 10:
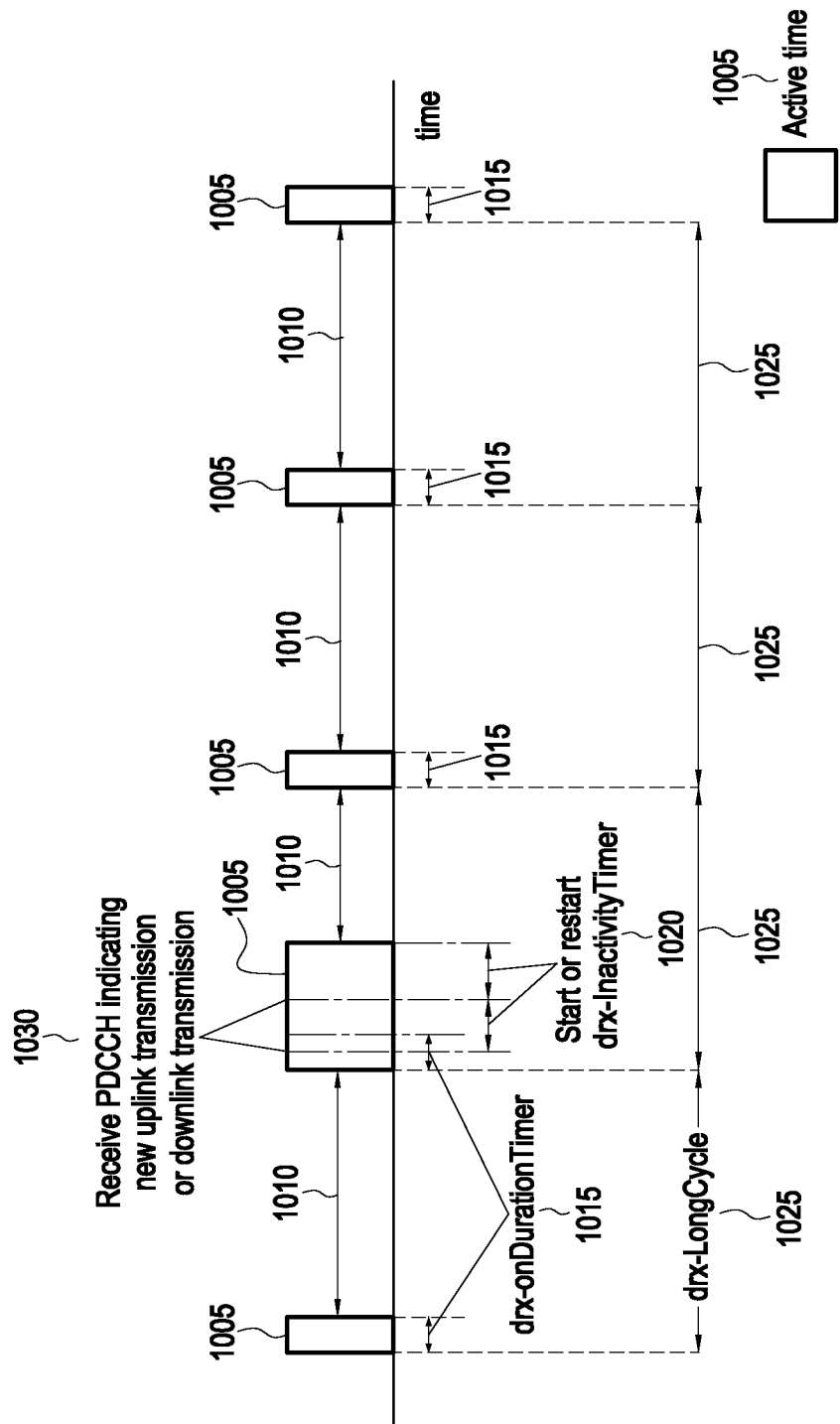
FIG. 10 illustrates a process of discontinuous reception (DRX) in a wireless communication system according to various embodiments of the disclosure.

FIG. 10 illustrates a process of discontinuous reception (DRX) in a wireless communication system according to various embodiments of the disclosure.

Specifically, FIG. 10 is a view illustrating a discontinuous reception (DRX) operation Specifically, discontinuous reception (DRX) is an operation in which a UE using a service discontinuously receives data in an RRC connected state in which a radio link is established between a base station and the UE. DRX is also referred to as DRX in RRC connected state (i.e., C-DRX). When DRX is applied, the UE turns on the receiver at a specific time to monitor control channel, and if there is no data received for a certain period of time, turns off the receiver to reduce power consumption of the UE. The DRX operation may be controlled by the MAC layer device based on various parameters and timers.

Referring to FIG. 10, an active time 1005 is a time during which the UE wakes up every DRX cycle and monitors PDCCH. The active time 1005 may be defined as follows.

drx-onDurationTimer or drx-InactivityTimer or drx-RetransmissionTimerDL or drx-RetransmissionTimerUL or ra-ContentionResolutionTimer is running; or a scheduling request is sent on PUCCH and is pending; or A PDCCH indicating a new transmission addressed to the C-RNTI of the MAC entity has not been received after successful reception of a Random Access Response for the Random Access Preamble not selected by the MAC entity among the contention-based Random Access Preamble The DRX-related timers, such as drx-onDurationTimer, drx-InactivityTimer, drx-RetransmissionTimerDL, drx-RetransmissionTimerUL, and ra-ContentionResolutionTimer, are timers whose values are set by the base station, and have the function of configuring the UE to monitor PDCCH in the circumstance where a predetermined condition is met.

The drx-onDurationTimer 1015 is a parameter for setting a minimum time during which the UE is awake in the DRX cycle. The drx-InactivityTimer 1020 is a parameter for setting an additional time during which the UE is awake when a PDCCH indicating new uplink transmission or downlink transmission is received (1030). The drx-RetransmissionTimerDL is a parameter for setting a maximum time during which the UE is awake to receive downlink retransmission in the downlink HARQ procedure. The drx-RetransmissionTimerUL is a parameter for setting a maximum time during which the UE is awake to receive an uplink retransmission grant in the uplink HARQ procedure. The above-described drx-onDurationTimer, drx-InactivityTimer, drx-RetransmissionTimerDL and drx-RetransmissionTimerUL may be set as, e.g., time, number of subframes, number of slots, and the like. The ra-ContentionResolutionTimer is a parameter for monitoring PDCCH in the random access procedure.

The inActive time 1010 is a time set to allow the UE not to monitor PDCCH during the DRX operation or a time set not to receive a PDCCH and may be the rest of the entire time during which DRX is performed, except for the active time 1005. If the UE does not monitor PDCCH during the active time 1005, the UE may enter a sleep or inactive state to reduce power consumption.

The DRX cycle means a cycle in which the UE wakes up and monitors PDCCH. In other words, the DRX cycle means a time interval from when the UE monitors a PDCCH to when the UE monitors a next PDCCH or an occurrence cycle of on-duration. There are two types of DRX cycles: a short DRX cycle and a long DRX cycle. The short DRX cycle may be optionally applied.

The long DRX cycle 1025 is the longer of the two DRX cycles configured in the UE. The UE starts the drx-onDurationTimer 1015 again, the long DRX cycle 1025 after the start point (e.g., start symbol) of the drx-onDurationTimer 1015 while operating in the long DRX cycle. When operating in the long DRX cycle 1025, the UE may start the drx-onDurationTimer 1015 in a slot after drx-SlotOffset in a subframe meeting Equation 2 below. Here, the drx-SlotOffset means a delay before starting the drx-onDurationTimer 1015. The drx-SlotOffset may be set to, e.g., time or number of slots, and the like.

$$[(SFN \times 10)+\text{subframe number}] \text{modulo}(drx\text{-Long-Cycle}) = drx\text{-StartOffset} \quad \text{[Equation 2]}$$

Here, the drx-LongCycleStartOffset may include the long DRX cycle 1025 and the drx-StartOffset, and may be used to define a subframe where the long DRX cycle 1025 starts. The drx-LongCycleStartOffset may be set as, e.g., time, number of subframes, number of slots, and the like.

The short DRX cycle is the shorter of two DRX cycles defined in the UE. The UE operates in the long DRX cycle 1025 and, if a predetermined event, e.g., reception 1030 of a PDCCH indicating new uplink transmission or downlink transmission, in the active time 1005, the UE starts or restarts the drx-InactivityTimer 1020 and, if the drx-InactivityTimer 1020 expires or a DRX command MAC CE is received, the UE may operate in the short DRX cycle. For example, in FIG. 10, the UE may start the drx-ShortCycleTimer at the time of expiration of the previous drx-onDurationTimer 1015 or drx-InactivityTimer 1020 and may operate in the short DRX cycle until the drx-ShortCycleTimer expires. When the UE receives (1030) a PDCCH indicating new uplink transmission or downlink transmission, the UE may extend the active time 1005 or delay arrival of the inactive time 1010 in anticipation of future additional uplink transmission or downlink transmission. While operating in the short DRX cycle, the UE restarts the drx-onDurationTimer 1015, the short DRX cycle after the start point of the previous On duration. Thereafter, when the drx-ShortCycleTimer expires, the UE operates back in the long DRX cycle 1025.

When operating in the short DRX cycle, the UE may start the drx-onDurationTimer 1015 after drx-SlotOffset in a subframe meeting Equation 3 below. Here, the drx-SlotOffset means a delay before starting the drx-onDurationTimer 1015. The drx-SlotOffset may be set to, e.g., time or number of slots, and the like.

$$[(SFN \times 10)+\text{subframe number}] \text{modulo}(drx\text{-ShortCycle}) = (drx\text{-StartOffset}) \text{modulo}(drx\text{-ShortCycle}) \quad \text{[Equation 3]}$$

Here, the drx-ShortCycle and the drx-StartOffset may be used to define a subframe where the short DRX cycle starts. The drx-ShortCycle and drx-StartOffset may be set as, e.g., time, number of subframes, or number of slots.

The DRX operation has been described above with reference to FIG. 10. According to an embodiment, the UE may reduce its power consumption by performing DRX. However, even when the UE performs DRX, the UE does not always receive the PDCCH associated with the UE in the active time 1005. Accordingly, according to an embodiment, a signal for controlling the operation of the UE may be provided to more efficiently save power of the UE.

A carrier aggregation and scheduling method in a 5G communication system is described below in detail.

The UE may access a primary cell through initial access, and the base station may additionally configure the UE with one or more secondary cells. The UE may perform communication through serving cells including the primary cell and secondary cells configured by the base station.

The base station may additionally configure whether to perform cross-carrier scheduling on the cells configured in the UE. For convenience of description, when cross-carrier scheduling is configured, cells performing scheduling (i.e., cells receiving downlink control information corresponding to downlink assignment or uplink grant) are collectively referred to as a "first cell," and a cell in which scheduling is performed (that is, a cell in which downlink or uplink data is actually scheduled and transmitted/received based on downlink control information) is referred to as a "second cell." If the UE is configured with cross-carrier scheduling for a specific cell A (scheduled cell) by the base station (in this case, cell A corresponds to the "second cell"), the UE does not perform PDCCH monitoring on cell A in cell A but may perform in another cell B indicated by the cross-carrier scheduling, i.e., the scheduling cell (in this case, cell B corresponds to the "first cell."). To configure the UE with cross-carrier scheduling, the base station may configure the UE with information for the "first cell" performing scheduling on the "second cell" (e.g., the cell index of the "first cell") and the carrier indicator field (CIF) value for the "second cell." For example, the configuration information set forth in Table 14 below may be provided from the base station to the UE through higher layer signaling (e.g., RRC signaling).

TABLE 14

```
CrossCarrierSchedulingConfig ::=    SEQUENCE {
    schedulingCellInfo                  CHOICE {
    own (self carrier scheduling)       SEQUENCE {   -
    - No cross carrier scheduling
    cif-Presence                        BOOLEAN
    },
    other (cross carrier scheduling)    SEQUENCE {   -
    - Cross carrier scheduling
    schedulingCellId                    ServCellIndex,
    (scheduling cell index)
    cif-InSchedulingCell                INTEGER (1..7)
    (CIF value)
    }
    },
    ...
}
```

The UE may monitor the PDCCH for the cell configured by cross-carrier scheduling in a "first cell". The UE may determine the index of the cell scheduled by the DCI received from the value of the carrier indicator field in the DCI format scheduling data, and based thereupon, may transmit/receive data in the cell indicated by the carrier indicator."

The scheduled cell (cell A) and the scheduling cell (cell B) may be configured with different numerologies. The numerology may include a subcarrier spacing, a cyclic prefix, and the like. In a case where cell A and cell B have different numerologies, when the PDCCH of cell B schedules the PDSCH of cell A, the following minimum scheduling offset between the PDCCH and the PDSCH may be additionally considered.

[Cross-Carrier Scheduling Method]

If the subcarrier spacing ($\mu_B$) of cell B is smaller than the subcarrier spacing ($\mu_A$) of cell A, a PDSCH may be scheduled from a next PDSCH slot which is X symbols after the last symbol of the PDCCH received from cell B. Here, X may differ depending on $\mu_B$, and may be defined as X=4 symbols when $\mu_B$=15 kHz, X=4 symbols when $\mu_B$-30 kHz, and X=8 symbols when $\mu_B$-60 kHz.

If the subcarrier spacing ($\mu_B$) of cell B is larger than the subcarrier spacing ($\mu_A$) of cell A, a PDSCH may be scheduled from a time, X symbols after the last symbol of the PDCCH received from cell B. Here, X may differ depending on UB, and may be defined as X=4 symbols when $\mu_B$=30 kHz, X=8 symbols when $\mu_B$=60 kHz, and X=12 symbols when $\mu_B$=120 kHz.

Described below in detail is a method for configuring a transmission configuration indication (TCI) state, which is a means for indicating or exchanging quasi co-location (QCL) information between a UE and a base station in a 5G communication system.

The base station may configure and indicate a TCI state between two different RSs or channels via proper signaling, announcing the QCL relationship between the different RSs or channels. Further, the base station may configure and indicate the TCI state for the PDCCH (or PDCCH DMRS) through appropriate signaling. The TCI state is intended for announcing a quasi co-location (QCL) relationship between different RSs or channels and PDCCH (or PDCCH DMRS). When different RS or channels are QCLed, this means that, in estimating channel via reference antenna port A (reference RS #A) and RS antenna port B (target RS #B), which have a QCL relationship, the UE is allowed to apply all or some of large-scale channel parameters estimated from antenna port A to channel measurement from antenna port B. QCL may be required to associate different parameters depending on contexts, such as 1) time tracking affected by average delay and delay spread, 2) frequency tracking affected by Doppler shift and Doppler spread, 3) radio resource measurement (RRM) affected by average gain, and 4) beam management (BM) affected by spatial parameter. Accordingly, NR supports four types of QCL relations as shown in Table 15 below.

TABLE 15

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

Spatial RX parameter may collectively refer to all or some of various parameters, such as the angle of arrival (AoA), the power angle spectrum (PAS) of AoA, the angle of departure (AoD), the PAS of AoD, transmit/receive channel correlation, transmit/receive beamforming, and spatial channel correlation.

The QCL relationship may be configured to the UE through RRC parameter TCI-State and QCL information (QCL-Info) as shown in Table 16 below. Referring to Table 16 below, the base station may configure the UE with one or more TCI states, indicating up to two QCL relationships (qcl-Type1, qcl-Type2) for the RS referencing the ID of the TCI state, i.e., the target RS. In this case, the QCL information (QCL-Info) included in each TCI state includes the serving cell index and BWP index of the reference RS indicated by the QCL information, type and ID of the reference RS, and the QCL type as shown in Table 15.

TABLE 16

```
TCI-State ::=                       SEQUENCE {
    tci-StateId                         TCI-StateId,
    (ID of the corresponding TCI state)
    qcl-Type1                           QCL-Info,
    (QCL information of the first reference RS of RS (target RS) referring
to the corresponding TCI state ID)
    qcl-Type2                           QCL-Info
        OPTIONAL,   -- Need R
    (QCL information of the second reference RS of the RS (target RS)
referring to the corresponding TCI state ID)
    ...
}
QCL-Info ::=                        SEQUENCE {
    cell                                ServCellIndex
        OPTIONAL,   -- Need R
    (the serving cell index of the reference RS indicated by the corresponding
QCL information)
    bwp-Id                              BWP-Id
```

TABLE 16-continued

```
    OPTIONAL, -- Cond CSI-RS-Indicated
(BWP index of reference RS indicated by the corresponding QCL information)
    referenceSignal                        CHOICE {
        csi-rs                             NZP-CSI-RS-
ResourceId,
        ssb                                SSB-
Index
        (one of the CSI-RS ID or SSB ID indicated by the corresponding QCL
information)
    },
    qcl-Type                               ENUMERATED {typeA,
typeB, typeC, typeD},
    ...
}
```

A paging method in a 5G communication system is described below in detail.

Figure 11:
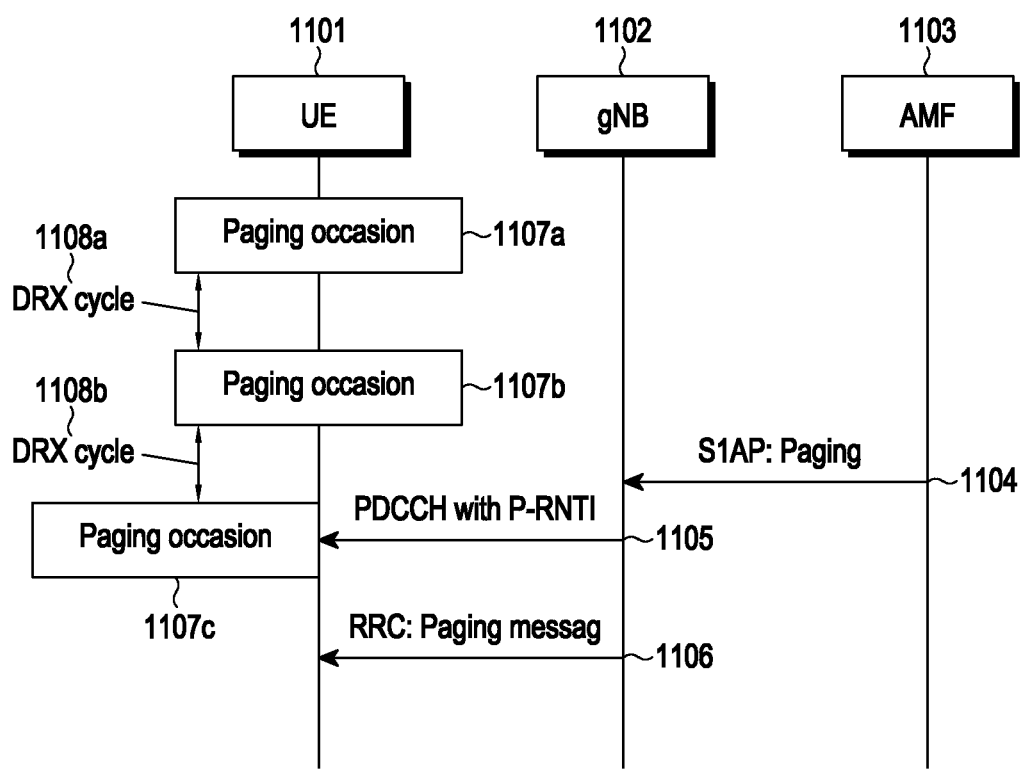
FIG. 11 illustrates a process of paging in a wireless communication system according to various embodiments of the disclosure.

FIG. 11 illustrates a process of paging in a wireless communication system according to various embodiments of the disclosure.

Specifically, FIG. 11 is a view illustrating a paging procedure of a 5G communication system. A paging procedure may be used to indicate that there is an incoming call to the UE in the IDLE state or INACTIVE state and to indicate that network access for UEs have commenced or to inform UEs in the CONNECTED state that system information has changed. Paging may be controlled by a mobility management entity (AMF), and a paging message may be transmitted over a plurality of cells in a tracking area (TA). Referring to FIG. 11, paging is transferred from the AMF 1103 to the UE 1101 via the base station gNB 1102. More specifically, paging starts from the AMF 1103 and is transferred 1104 to the gNB 1102 through S1AP signaling 1104 and is then transferred to the UE 1101 through RRC signaling 1106. In this case, the UE 1101 may know whether a paging message exists by monitoring the PDCCH 1105 configured with the P-RNTI on the paging occasions 1107a, 1170b, and 1170c. The paging occasions 1170a, 1170b, and 1170c may be determined based on the DRX cycles 1108a and 1108b configured by the base station to the UE. Upon receiving the PDCCH 1105 configured with the P-RNTI, the UE may receive the paging message 1106 on the PDSCH scheduled through the PDCCH 1105. The paging message 1106 may include UE identifier (UE ID) information about the UE to be awakened by the base station.

An efficient paging procedure should be such that most of time, the UE 1101 may rest without performing reception but, only during predetermined time interval, wakes up to observe the paging information from the network. To that end, in NR, paging occasion (PO) and paging frame (PF) were defined. The PO may be defined as a subframe or a time point when a PDCCH configured with a P-RNTI for receiving a paging message exists. The PF may be defined as one radio frame including one or a plurality of POs. According to the embodiment of FIG. 11, the UE 1101 may observe one PO per discontinuous reception (DRX) cycle 1108a and 1108b.

Figure 12:
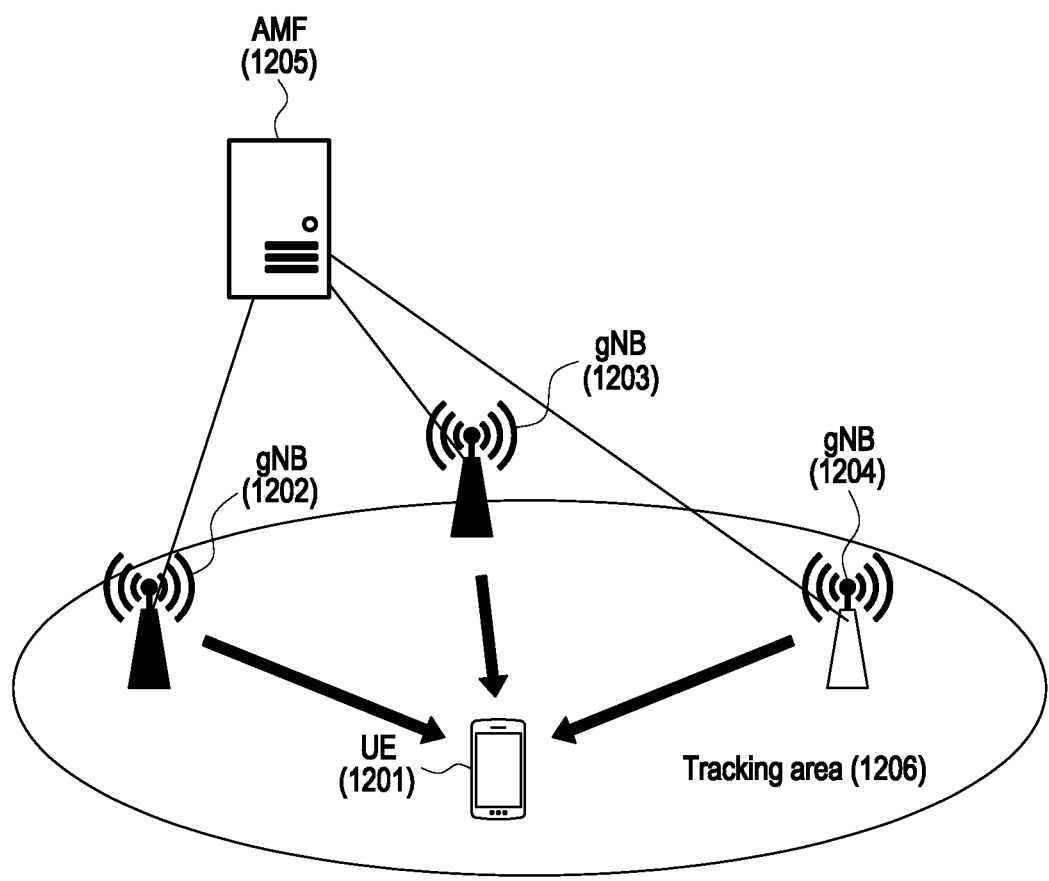
FIG. 12 illustrates a process of paging in a wireless communication system according to various embodiments of the disclosure.

FIG. 12 is a view illustrating a paging operation in a wireless communication system according to various embodiments of the disclosure.

Specifically, referring to FIG. 12, when the UE 1201 is in the RRC_IDLE state, the NR network knows the location of the UE 1201 in units of tracking areas (TAs) 1206 rather than in units of cells. When accessing the NR network (i.e., 5G network), the UE is allocated a tracking area identity (TAI) list by the access and mobility management function (AMF) 1205. The UE 1201 may move freely within the cell in the TAI list without AMF 1205 update. When an incoming call to the UE 1201 occurs, the AMF 1205 transfers the same paging message to all the cells 1202, 1203, and 1204 in the TA 1206 currently configured to the UE 1201, and each cell 1202, 1203, and 1204 transfers the paging message to the corresponding UE 1201. When a certain cell is (re) selected, the UE 1201 may obtain the tracking area code (TAC) of the corresponding cell through system information (e.g., SIB1) and, therefrom, identify whether the corresponding cell is a cell in its TAI list. If the TAC of the selected cell is not in the TAI list, the UE sends a TAU message to the AMF 1205. When transmitting a response (TAU Accept) to the TAU message, the AMF 1205 may transfer the TAI list together, updating the UE with the TAI list according to the UE's relocation.

A PDCCH monitoring operation for the UE to receive paging is described below in detail.

The UE may monitor one paging occasion (PO) per DRX cycle. One PO may be constituted of a set of a plurality of PDCCH monitoring occasions, and a slot in which DCI for paging may be transmitted may be constituted of a plurality of time slots/resources (e.g., subframe or OFDM symbol). One paging frame (PF) may correspond to one radio frame and may include one or more POs or the start point of any PO.

During multi-beam operation, the UE may assume that the same paging message or the same short message is repeated on all transmission beams. In this case, which beam is selected to receive the paging message or the short message may be determined by the implementation of the UE. For radio access network (RAN) initiated paging and core network (CN) initiated paging, all the paging messages may be the same.

If receiving the RAN initiated paging, the UE may start an RRC connection resume procedure. If receiving the CN initiated paging in the RRC_INACTIVE state, the UE may change to the RRC_IDLE mode and notify the network attached storage (NAS) of it.

The paging frame (PF) and paging occasion (PO) paging may be determined by the following equations.

The system frame number (SFN) corresponding to the paging frame may be determined by Equation 4 below. In Equation 4 below, A mod B may mean a modulo operation that outputs the remainder obtained by dividing A by B.

$$(SFN + PF\_\text{offset}) \bmod T = (T \text{ div } N) * (UE\_ID \bmod N) \quad \text{[Equation 4]}$$

$$i\_s = \text{floor}(UE\_ID/N) \bmod Ns \quad \text{[Equation 5]}$$

The respective parameters of Equation 4 and Equation 5 to determine the above-described paging frame and paging occasion may be defined as follows.

T: The DRX cycle configured in the UE may be configured with higher layer signaling (e.g., RRC signaling or system information block (SIB))

N: Total number of paging frames in T

Ns: Number of paging occasions for one paging frame

PF_offset: Offset value for determining the time of the paging frame

UE_ID: A UE ID for determining the paging frame and the paging occasion, which may be determined as in Equation 6 below.

$$UE\_ID = 5G\text{-}S\text{-TMSI} \bmod 1024 \quad \text{[Equation 6]}$$

The 5G S-temporary mobile subscription identifier (5G-S-TMSI) is a temporary UE identifier provided by the core network to uniquely identify the UE within the tracking area (TA). The 5G-S-TMSI may be received by the UE through, e.g., higher layer signaling. If the UE has not yet been registered with the network, the UE may assume that UE_ID is 0. Or, the UE ID for paging may correspond to a parameter determined by the international mobile subscriber identity (IMSI). In the disclosure, the UE ID for paging is generalized to be used as UE_ID. Here, the UE_ID may include both a value that may be set based on the 5G-S-TMSI and a value that may be derived from the IMSI value.

The PDCCH (or PDCCH scrambled with the P-RNTI) monitoring occasions for paging may be determined by the search space configuration for paging (e.g., search space indicated with the higher layer signaling parameter pagingSearchSpace) and the configuration for the first PDCCH monitoring occasion of the paging occasion (e.g., the higher layer signaling parameter firstPDCCH-MonitoringOccasionOfPO) information and the number of PDCCH monitoring occasions per SS/PBCH block (SSB) in the paging occasion (e.g., the higher layer signaling parameter nrofPDCCH-MontiroingOccasionPerSSB-InPO). The pagingSearchSpace, firstPDCCH-MonitoringOccasionOfPO, and nrofPDCCH-MontiroingOccasionPerSSB-InPO may be specifically defined as in Table 17 below.

occasion may exist in the paging frame, and if Ns=2, two paging occasions may exist in the paging frame, the first paging occasion (i_s=0) may exist in the first half frame in the paging frame, and the second paging occasion (i_s=1) may exist in the second half frame in the paging frame. Here, the search space with a search space ID of 0 may correspond to a search space set from the master information block (MIB).

If the paging search space is set as a search space in which the search space ID is not 0, the UE may monitor the (i_s+1)th paging occasion. One paging occasion may be constituted of a set of 'S*X' contiguous PDCCH monitoring occasions. Here, 'S' may correspond to the number of actually transmitted SS/PBCH blocks (SSBs), and the corresponding information may be transferred from the base station to the UE as a specific parameter (e.g., ssb-PositionsInBurst) value of the system information block (SIB). 'X' may correspond to the number of PDCCH monitoring occasions per SS/PBCH block in the paging occasion set to the UE from the base station (e.g., higher layer signaling parameter nrofPDCCH-MontiroingOccasionPerSSB-InPO) and, if there is no corresponding configuration information, the UE may assume that X=1. The [x*S+K]th PDCCH monitoring occasion in the paging occasion (where x=0, 1, 2, . . . , X−1 and may be defined as K=1, 2, 3, . . . , S) may correspond to the Kth transmission SS/PBCH block. Starting with the first PDCCH monitoring occasion in the paging frame, PDCCH monitoring occasions that do not overlap the uplink (UL) symbol may be sequentially numbered from 0. In this case, if the firstPDCCH-MonitoringOccasionOfPO is set through higher layer signaling, the start PDCCH monitoring occasion number of the (i_s+1)th paging occasion may correspond to the (i_s+1)th value in the firstPDCCH-MonitoringOccasionOfPO parameter. If the firstPDCCH-MonitoringOccasionOfPO is not set through higher layer signaling, the start PDCCH monitoring occasion number of the (i_s+1)th paging occasion may be the same as i_s*S*X. If X>1, when the UE detects the PDCCH corresponding to the P-RNTI on a certain paging occasion, the UE does not need to perform monitoring on the rest of the corresponding paging occasion or subsequent PDCCH monitoring.

One paging occasion associated with a certain paging frame may be started within the corresponding paging frame or after the corresponding paging frame.

PDCCH monitoring occasions for any paging occasion may exist over a plurality of radio frames. When the search space for paging is set as a search space having a search space ID other than 0, the PDCCH monitoring occasions for one paging occasion may exist over a plurality of cycles of the paging search space.

TABLE 17 pagingSearchSpace
ID of the Search space for paging (see TS 38.213 [13], clause 10.1). If the field is absent, the UE does not receive paging in this BWP (see TS 38.213 [13], clause 10).
firstPDCCH-MonitoringOccasionOfPO
Points out the first PDCCH monitoring occasion for paging of each PO of the PF, see TS 38.304 [20].
nrofPDCCHMonitoringOccasionPerSSB-InPO
The number of PDCCH monitoring occasions corresponding to an SSB for paging, see TS 38.304 [20] clause 7.1.

In a case where the paging search space is set as a search space with a search space ID of 0, if the number (Ns) of paging occasions for one paging frame is 1, one paging Referring to the TS 38.304 standard, discontinuous reception for paging is defined as shown in Table 18a and Table 18b below.

TABLE 18a

| |
|---|
| 7 Paging |
| 7.1 Discontinuous Reception for paging |
| The UE may use Discontinuous Reception (DRX) in RRC_IDLE and KRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO. |
| In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging. |
| The UE initiates RRC Connection Resume procedure upon receiving RAN initiated paging. If the UE receives a CN initiated paging in RRC_INACTIVE state, the UE moves to RRC_IDLE and informs NAS. |
| The PF and PO for paging are determined by the following formulae: |
|    SFN for the PF is determined by: |
|      (SFN + PF_offset) mod T = (T div N)*(UE_ID mod N) |
|    Index (I_s), indicating the index of the PO is determined by: |
|      i_s = floor (UE_ID/N) mod Ns |
| The PDCCH monitoring occasions for paging are determined according to pagingSearchSpace as specified in TS 38.213 [4] and firstPDCCH-MonitoringOccasionOfPO and nrofPDCCH-MonitoringOccasionPerSSB-InPO if configured as specified in TS 38.331 [3]. When SearchSpaceId = 0 is configured for pagingSearchSpace, the PDCCH monitoring occasions for paging are same as for RMSI as defined in clause 13 in TS 38.213 [4]. |
| When SearchSpaceId = 0 is configured for pagingSearchSpace, Ns is either 1 or 2. For Ns = 1, there is only one PO which starts from the first PDCCH monitoring occasion for paging in the PF. For Ns = 2, PO is either in the first half frame (i_s = 0) or the second half frame (i_s = 1) of the PF. |
| When SearchSpaceId other than 0 is configured for pagingSearchSpace, the UE monitors the $(i\_\$ + 1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0,1,...,X−1, K=1,2,...,S. |
| The PDCCH monitoring occasions for paging which do not overlap with UL symbols (determined according to tdd-UZ-DL-ConfigurationCommon) are sequentially numbered from zero starting from the first PDCCH monitoring occasion for paging in the PF. |
| When firstPDCCH-MonitoringOccasionOfPO is present, the starting PDCCH monitoring occasion number of $(i\_s + 1)^{th}$ PO is the $(i\_s + 1)^{th}$ value of the firstPDCCH-MonitoringOccasionOfPO parameter; otherwise, it is equal to i_s * S*X. If X > 1, when the UE detects a PDCCH transmission addressed to P-RNTI within its PO, the UE is not required to monitor the subsequent PDCCH monitoring occasions for this PO |
|    NOTE 1:    A PO associated with a PF may start in the PF or after the PF. |
|    NOTE 2:    The PDCCH monitoring occasions for a PO can span multiple radio frames. When SearchSpaceId other than 0 is configured for paging-SearchSpace the PDCCH monitoring occasions for a PO can span multiple periods of the paging search space. |

TABLE 18b

| |
|---|
| The following parameters are used for the calculation of PF and i_s above: |
|    T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied). |
|    N: number of total paging frames in T |
|    Ns: number of paging occasions for a PF |
|    PF_offset: offset used for PF determination |
|    UE_ID: 5G-S-TMSI mod 1024 |
| Parameters Ns, nAndPagingFrameOffset, nrofPDCCH-MonitoringOccasion.PerSSB-InPO, and the length of default DRX Cycle are signaled in SIB1. The values of N and PF_offset are derived from the parameter nAndPagingFrameOffset as defined in TS 38.331 [3]. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration. |
| If the UE has no 5G-S-TMSI, for instance when the UE has not yet registered onto the network, the UE shall use as default identity UE_ID = 0 in the PF and i_s formulas above. |
| 5G-S-TMSI is a 48 bit long bit string as defined in TS 23.501 [10]. 5G-S-TMSI shall in the formulae above be interpreted as a binary number where the left most bit represents the most significant bit. |

The base station may transmit a PDCCH for paging to the UB. The corresponding PDCCH may include scheduling information for the PDSCH including the paging message. The paging message may include ID information about one or more UEs to be awakened by the base station. More specifically, the information exemplified in Table 19 below may be included in the paging message.

TABLE 19

| Paging message |
| --- |
| -- ASN1START<br>-- TAG-PAGING-START<br>Paging ::=           SEQUENCE {<br>   pagingRecordList           PagingRecordList           OPTIONAL,<br>-- Need N<br>   (paging record list)<br>   lateNonCriticalExtension      OCTET STRING              OPTIONAL,<br>   nonCriticalExtension          SEQUENCE{ }               OPTIONAL<br>}<br>PagingRecordList ::=    SEQUENCE (SIZE (1..maxNrofPageRec)) OF PagingRecord<br>PagingRecord ::=        SEQUENCE {<br>   ue-Identity            PagingUE-Identity,<br>   (ue identity(ID))<br>   accessType             ENUMERATED {non3GPP} OPTIONAL, -- Need N<br>   (access type)<br>   ...<br>}<br>PagingUE-Identity :: =  CHOICE {<br>   ng-5G-S-TMSI           NG-5G-S-TMSI,<br>   fullI-RNTI             I-RNTI-Value,<br>   ...<br>} |

After receiving the PDCCH for paging from the base station, the UE may receive the PDSCH scheduled by the corresponding PDCCH. The UEs with the same UE_ID as the one indicated from the paging message transmitted on the received PDSCH may be awakened to perform the subsequent operation procedure (e.g., random access or RRC connection).

The content of the DCI format scrambled with the P-RNTI in the 5G communication system is described below in detail. The DCI format scrambled with the P-RNTI may be constituted of, e.g., the following fields.

Short Messages Indicator-2 Bits

Short message-8 bits, according to Clause 6.5 of [9, TS38.331]. If only scheduling information for paging is transferred, this field is reserved.

Frequency domain resource allocation information—$\lceil \log_2(N_{RB}^{DLBWP}(N_{RB}^{DL,BWP}+1)/2) \rceil$ bit, if only short messages are transferred, this field is reserved. $N_{RB}^{DL,BWP}$ is defined as the number of RBs in the downlink bandwidth part.

Time domain resource allocation information-4 bits, if only short messages are transferred, this field is reserved.

VRB-to-PRB mapping-1 bit according to Table 7.3.1.2.2-5. If only short messages are transferred, this field is reserved.

Modulation and coding scheme-5 bits, if only short messages are transferred, this field is reserved.

TB scaling-2 bits as defined in Clause 5.1.3.2 of [6, TS38.214]. If only short messages are transferred, this field is reserved.

Reserved bits-8 bits for operation in a cell with shared spectrum channel access, otherwise 6 bits

TABLE 20

| Bit field | Short Message indicator |
| --- | --- |
| 00 | Reserved |
| 01 | Only scheduling information for Paging is present in the DCI |

TABLE 20-continued

| Bit field | Short Message indicator |
| --- | --- |
| 10 | Only short message is present in the DCI |
| 11 | Both scheduling information for Paging and short message are present in the DCI |

Table 20 shows a short message indicator in the DCI format scrambled with the P-RNTI.

Referring to Table 20, the short message indicator is reserved when the bit field is 00, and when the bit field is 01, it indicates that only scheduling information for paging is present in the DCI and, when the bit field is 10, it indicates that only short message is present in the DCI and, when the bit field is 11, it indicates that both scheduling information for paging and short message are present in the DCI.

The method for configuring the TCI state for the PDCCH (or PDCCH DMRS) in the 5G communication system is the same as the description made above with reference to Table 15 and Table 16.

Figure 13:
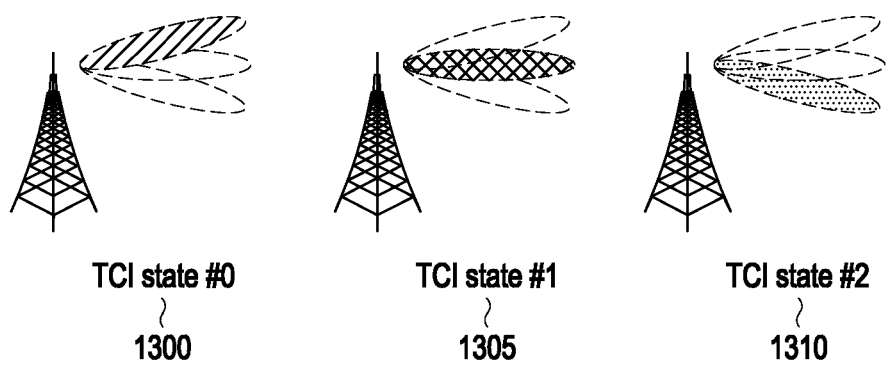
FIG. 13 illustrates a base station beam allocation according to a TCI state in a wireless communication system according to various embodiments of the disclosure.

FIG. 13 illustrates a base station beam allocation according to a TCI state in a wireless communication system according to various embodiments of the disclosure.

Specifically, FIG. 13 illustrates an example of base station beam allocation according to TCI state configuration. Referring to FIG. 13, the base station may transfer information about N different beams to the UE through N different TCI states. For example, when N=3 as shown in FIG. 13, the base station may inform the UE that the qcl-Type2 parameter (refer to Table 16 above) included in three TCI states 1300, 1305, and 1310 is associated with the CSI-RSs or SSBs corresponding to different beams and are rendered to be set in QCL type D so that the antenna ports referencing the different TCI states 1300, 1305, and 1310 are associated with different spatial RX parameters, i.e., different beams. Specifically, a combination of TCI states applicable to the PDCCH DMRS antenna ports is shown in Table 21 below. In Table 21, the fourth row is a combination assumed by the UE before RRC configuration, and configuration after RRC is not possible.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 14:
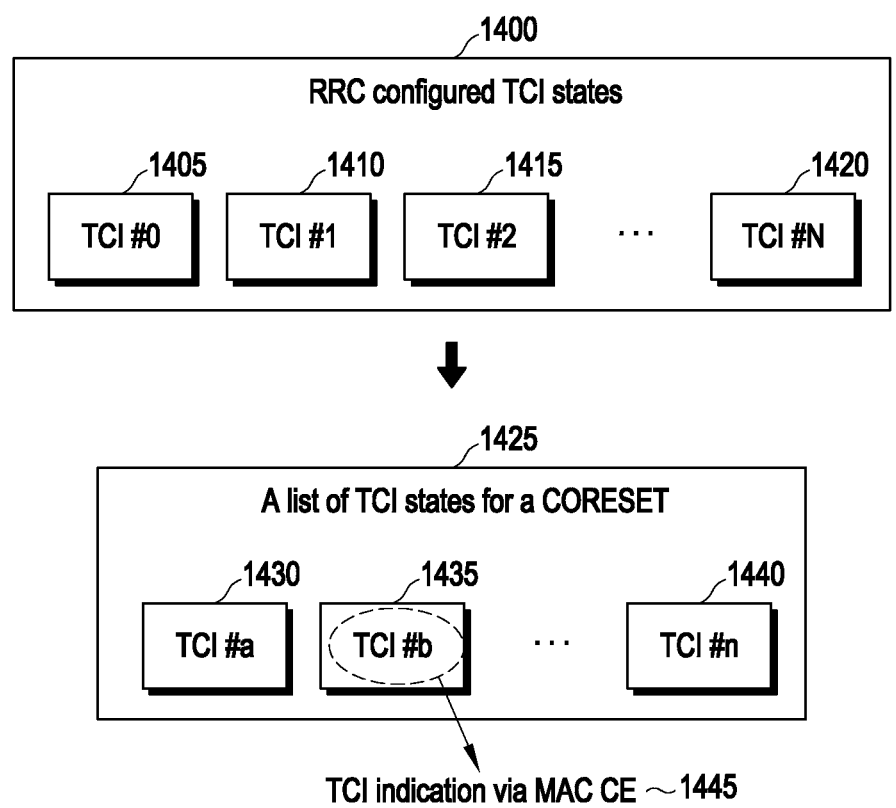
FIG. 14 illustrates a process of hierarchical signaling in a wireless communication system according to various embodiments of the disclosure.

FIG. 14 illustrates a process of hierarchical signaling in a wireless communication system according to various embodiments of the disclosure.

An embodiment of the disclosure supports a hierarchical signaling method as shown in FIG. 14 for dynamic allocation of a PDCCH beam. Referring to FIG. 14, the base station may configure N TCI states 1405, 1410, 1415, ..., 1420 to the UE through RRC signaling 1400 and set some of them as TCI states for CORESET (1425). Thereafter, the base station may indicate one of the TCI states 1430, 1435, ..., 1440 for CORESET to the UE through MAC CE signaling (1445). Thereafter, the UE may receive DCI on the PDCCH based on the beam information included in the TCI state indicated by the MAC CE signaling.

Figure 15:
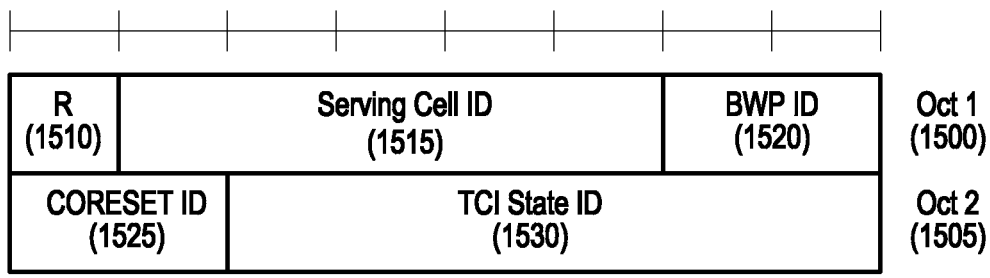
FIG. 15 illustrates an example of a signaling structure in a wireless communication system according to various embodiments of the disclosure.

FIG. 15 illustrates an example of a signaling structure in a wireless communication system according to various embodiments of the disclosure.

is 0 or control resource set #0) configured through the MIB, the UE may assume that the physical layer channel has been QCLed in view of average gain, QCL-TypeA, and QCL-TypeD characteristics.

DMRS (or DMRS antenna port) associated with the PDCCH received with the control resource set set through the MIB (or the control resource set with a control resource set ID of 0 or control resource set #0)

DMRS antenna port associated with the reception of the PDSCH corresponding thereto (or PDSCH scheduled by the PDCCH transmitted with control resource set #0)

SS/PBCH block corresponding thereto (or SS/PBCH block associated with control resource set #0 or SS/PBCH block for transmitting MIB configuring the corresponding control resource set #0)

A part of the TS 38.213 standard related to what has been described above is shown in Table 22 below.

TABLE 22

The UE may assume that the DM-RS antenna port associated with PDCCH receptions in the CORESET configured by pdcch-ConfigSIB1 in MIB, the DM-RS antenna port associated with corresponding PDSCH receptions. and the corresponding SS/PBCH block are quasi co-located with respect to average gain. QCl-TypeA, and QCL-TypeD properties, when applicable [6, TS 38.214]. if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB.

Specifically, FIG. 15 is a view illustrating a TCI indication MAC CE signaling structure for PDCCH DMRS. Referring to FIG. 15, the TCI indication MAC CE signaling for the PDCCH DMRS is constituted of 2 bytes (16 bits) and includes a reserved bit 1510 of 1 bit, a serving cell ID 1515 of 5 bits, a BWP ID 1520 of 2 bits, a CORESET ID 1525 of 2 bits, and a TCI state ID 1530 of 6 bits.

The base station may set one or a plurality of TCI states for a specific control resource set (CORESET) to the UE and activate one of the set TCI states through the TCI indication MAC CE activation command. For example, {TCI state #0, TCI state #1, TCI state #2} are set in control resource set #1 as TCI states. The base station may transmit, to the UE, a command to activate to assume TCI state #0 as the TCI state for control resource set #1, through a TCI indication MAC CE. Based on the activation command for the TCI state received through the TCI indication MAC CE, the UE may correctly receive the DMRS of the corresponding control resource set based on QCL information in the activated TCI state.

If the UE is not provided with the TCI state configuration indicating the QCL information for the DMRS antenna port for receiving the PDCCH of the control resource set (or the control resource set whose control resource set ID (or index)

If a search space whose search space ID is 0 has been configured for the common search space set for monitoring the SI-RNTI/P-RNTI for the UE (or when the common search space set for monitoring the SI-RNTI/P-RNTI is a search space set configured with the MIB or in the case of search space #0), the UE may monitor the PDCCH in a monitoring occasion associated with SS/PBCH block A and, in this case, SS/PBCH block A may be determined as follows.

The UE may receive a command for activating a specific TCI state for control region #0 through the TCI indication MAC CE and, in this case, the TCI state may include the CSI-RS associated with any SS/PBCH. The SS/PBCH associated with the CSI-RS in the TCI state activated through the TCI indication MAC CE most recently received by the UE may correspond to SS/PBCH block A.

When performing random access, the UE may transmit a preamble (or physical random access channel (PRACH)) associated with a specific SS/PBCH to the base station. The SS/PBCH identified through the random access procedure most recently performed by the UE may correspond to SS/PBCH block A.

A part of the TS 38.213 standard related to what has been described above is shown in Table 23 below.

TABLE 23

If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set as described in Clause 13, and the UE is provided a C-RNTI, the UE monitors PDCCH candidates only at monitoring occasions associated with a SS/PBCH block, where the SS/PBCH block is determined by the most recent of
- a MAC CE activation command indicating a TCI state of the active BWP that includes a CORESET with index 0, as described in [6, TS 38.214], where the TCI-state includes a CSI-RS which is quasi-co-located with the SS/PBCH block, or
- a random access procedure that is not initiated by a PDCCH order that triggers a contention-free random access procedure For the control resource set (control resource set #X) whose index is set to a value other than 0, If the TCI state for control resource set #X is not configured to the UE or if one or more TCI states are configured but a TCI indication MAC CE activation command for activating one of them is not received, the UE may assume that the DMRS transmitted in control resource set #X has been QCLed with the SS/PBCH block identified in the initial access process.

If the UE has been configured with one or more TCI states as part of a handover procedure (or part of the Reconfiguration with synch procedure), but fails to receive a TCI indication MAC CE activation command to activate one of them, the UE may assume that the DMRS transmitted in control resource set #X has been QCLed with the SS/PBCH or CSI-RS resource identified during the random access procedure initiated with the handover procedure (or Reconfiguration with synch procedure).

A part of the TS 38.213 standard related to what has been described above is shown in Table 24 below.

TABLE 24

For a CORESET other than a CORESET with index 0.
- if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [11, TS 38.321], the UE assumes that the DM-RS antenna port associated with PDCCH receptions is quasi co-located with the SS/PBCH block the UE identified during the initial access procedure;
- if a UE has been provided a configuration of more than one TCI states by tci-StatesPDCCH-ToAddList and tci-StatesPDCCH-ToReleaseList for the CORESET as part of Reconfiguration with sync procedure as described in [12, TS 38.331] but has not received a MAC CE activation command for one of the TCI states as described in [11, TS 38.321]. the UE assumes that the DM-RS antenna port associated with PDCCH receptions is quasi co-located with the SS/PBCH block or the CSI-RS resource the UE identified during the random access procedure initiated by the Reconfiguration with sync procedure as described in [12, TS 38.331].

For the control resource set whose index is 0 (control resource set #0), the UE may assume that the DMRS antenna port of the PDCCH received in control resource set #0 has been QCLed with the following physical resource.

A downlink reference signal included in the TCI state activated by the TCI indication MAC CE activation command; or If the terminal does not receive the TCI indication MAC CE activation command for the TCI state, the SS/PBCH block identified by the terminal through the most recently random access procedure (however, random access, not non-contention-based random access triggered in PDCCH order)

A part of the TS 38.213 standard related to what has been described above is shown in Table 25 below.

TABLE 25

For a CORESET with index 0, the UE assumes that a DM-RS antenna port for PDCCH receptions in the CORESET is
quasi co-located with
- the one or more DL RS configured by a TCI state, where the TCI state is indicated by a MAC CE activation command for the CORESET, if any, or
- a SS/PBCH block the UE identified during a most recent random access procedure not initiated by a PDCCH order that triggers a contention-free random access procedure, if no MAC CE activation command indicating a TCI state for the CORESET is received after the most recent random access procedure.

Master information block (MIB)
SIB (System Information Block) or SIB X (X=1, 2, . . . )
Radio resource control (RRC)
Medium access control (MAC) control element (CE)
UE Capability Reporting
UE assistance information message Further, L1 signaling may be signaling corresponding to at least one or a combination of one or more of the following physical layer channels or signaling methods.

Physical downlink control channel (PDCCH)
Downlink control information (DCI)
UE-specific DCI
Group common DCI
Common DCI
Scheduling DCI (e.g., DCI used for scheduling downlink or uplink data)
Non-scheduling DCI (e.g., DCI not for the purpose of scheduling downlink or uplink data)
Physical uplink control channel (PUCCH)
Uplink control information (UCI)

In the following description, the definition of each mathematical operator is as follows.

floor(X): A function that outputs the largest integer less than X.
ceil(X): A function that outputs the smallest integer larger than X.
A mod B: A function that outputs the remainder of dividing A by B (modulo operator)
max(X,Y): A function that outputs the larger of X and Y
min(X,Y): A function that outputs the smaller of X and Y Hereinafter, terms, such as paging PDCCH, PDCCH for paging, PDCCH corresponding to paging, PDCCH scrambled with P-RNTI, and PDCCH configured with P-RNTI may all have the same meaning.

Hereinafter, terms, such as paging PDSCH, PDSCH for paging, PDSCH transmitting a paging message, PDSCH scrambled with P-RNTI, and PDSCH configured with P-RNTI may all have the same meaning.

As described above, in the wireless communication system, the base station may transmit paging for the purpose of waking the UE. The base station may transmit a PDCCH and a PDSCH for paging to the UE. The UE may receive configuration information for monitoring the PDCCH for paging from the base station and, based on the corresponding configuration information, determine the paging frame and the paging occasion. The UE may monitor the PDCCH for paging in one or more PDCCH monitoring occasions in the paging occasion. In this case, the réception beam assumed at the reception end when the UE monitors the PDCCH may vary depending on the configuration information for monitoring the PDCCH' for paging (specifically, configuration information about the search space and configuration information for the control resource set). In other words, the UE may differently control the assumption for the QCL relation for receiving the PDCCH according to the PDCCH configuration information for paging.

The disclosure provides various embodiments of assuming the QCL relation of the UE according to the paging PDCCH configuration information.

In an embodiment of the disclosure, the control resource set with a control resource set ID (or index) of X is defined as control resource set #X.

In a first embodiment of the disclosure, there is proposed a method of assuming the QCL when the UE monitors the paging PDCCH when the UE is configured with control resource set #0 (which may be referred to as a first control resource set or common control resource set) as the control resource set for monitoring the paging PDCCH from the base station and is configured with search space #0 (which may be referred to as a first search space or common search space) as the search space.

In a case where the UE is configured with control resource set #0 as the control resource set for paging PDCCH and is configured with search space #0 as the search space, the UE may assume that the SS/PBCH block (SSB) where the DMRS antenna port of the PDCCH received through control resource set #0 and the DMRS antenna port of the PDSCH scheduled by the corresponding PDCCH are all associated with control resource set #0 is QCLed in terms of at least one of QCL-TypeA or QCL-TypeD.

In a specific example, the UE may receive SS/PBCH block A and receive configuration information about control resource set #0 and configuration information about search space #0 from the MIB transmitted on the PBCH received. The UE may monitor the PDCCH for paging based on the received configuration information about control resource set #0 and search space #0. In this case, the UE may assume that the DMRS antenna port of the PDCCH and the DMRS antenna port of the PDSCH scheduled by the PDCCH are all QCLed with SS/PBCH block A. Accordingly, the UE may perform reception based on the reception parameter when receiving SS/PBCH block A when receiving the PDCCH and PDSCH for paging.

According to an embodiment of the disclosure, the base station may set control resource set #0 as the control resource set for monitoring the PDCCH for paging and search space #0 as the search space, to the UE. In this case, when transmitting the PDCCH and PDSCH for paging to the UE, the base station may transmit the PDCCH and PDSCH for paging based on the same (or similar) transmission parameter as the one when transmitting the SS/PBCH block associated with control resource set #0. As an example, when transmitting the PDCCH for paging with control resource set #0, the base station may transmit the PDCCH for paging with the same beam as the transmission beam used when transmitting the SS/PBCH block and may transmit the PDSCH for paging with the same beam as the transmission beam used when transmitting the SS/PBCH block for the PDSCH scheduled by the PDCCH for paging.

A second embodiment of the disclosure proposes a method of assuming QCL when the UE monitors the paging PDCCH when the UE is configured with control resource set #0 (first control resource set or common control resource set) as the control resource set for monitoring the PDCCH for paging from the base station and is configured with search space #X (X≠0) (which may be referred to as a second search space or a specific search space) whose search space ID is not 0 (first search space or common search space).

If the paging search space is set as search space #X (X≠0) in which the search space ID is not 0, the UE may monitor the (i_s+1)th paging occasion. Here, (i_s+1) may be understood as an index indicating a paging occasion. One paging occasion may be constituted of a set of 'S*X' contiguous PDCCH monitoring occasions. Here, 'S' may correspond to the number of actually transmitted SS/PBCH blocks, and the corresponding information may be transferred from the base station to the UE as a specific parameter (e.g., ssb-PositionsInBurst) value of the system information block (SIB). 'X' may correspond to the number of PDCCH monitoring occasions per SS/PBCH block in the paging occasion set to the UE from the base station (e.g., higher layer signaling parameter nrofPDCCH-MontiroingOccasionPerSSB-InPO) and, if there is no corresponding configuration information, the UE may assume that X=1 or a predetermined value. The [x*S+K]th PDCCH monitoring occasion in the paging occasion (where x=0, 1, 2, . . . , X−1 and may be defined as K=1, 2, 3, . . . , S) may correspond to the Kth transmission SS/PBCH block. Starting with the first PDCCH monitoring occasion in the paging frame, PDCCH monitoring occasions that do not overlap the uplink (UL) symbol may be sequentially numbered from 0. In this case, if the firstPDCCH-MonitoringOccasionOfPO which is the configuration information for the first PDCCH monitoring occasion is set through higher layer signaling, the start (first) PDCCH monitoring occasion number of the (i_s+1)th paging occasion may correspond to the (i_s+1)th value in the firstPDCCH-MonitoringOccasionOfPO parameter. If the firstPDCCH-MonitoringOccasionOfPO is not set through higher layer signaling, the start (first) PDCCH monitoring occasion number of the (i_s+1)th paging occasion may be the same as i_s*S*X. If X>1, when the UE detects the PDCCH corresponding to the P-RNTI on a certain paging occasion, the UE does not need to perform monitoring on the rest of the corresponding paging occasion or subsequent PDCCH monitoring.

Figure 16:
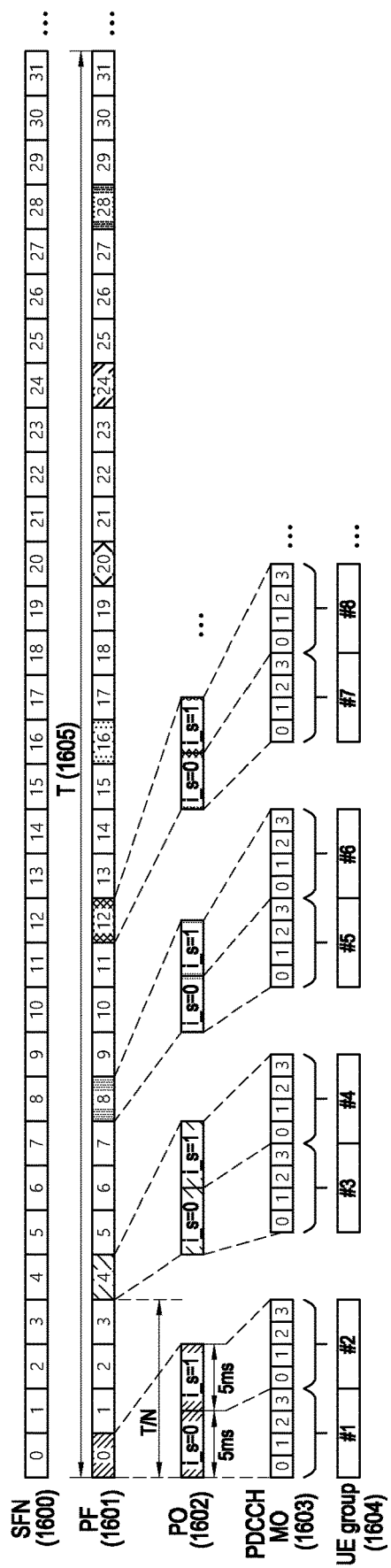
FIG. 16 illustrates a process of paging in a wireless communication system according to various embodiments of the disclosure.

FIG. 16 illustrates an example of a paging method when a search space for monitoring a PDCCH for paging corresponds to search space #X (X≠0) according to an embodiment of the disclosure. Search space #X (X≠0) means a search space in which the search space ID is not 0 as described above.

Referring to FIG. 16, the UE may be configured with a DRX cycle for paging and T 1605 from the base station. In period T, one or more paging frames PF 1601 may exist. Further, one or more paging occasions 1602 may exist in any paging frame 1601. Further, one or more PDCCH monitoring occasions (PDCCH MOs) 1603 may exist in any paging occasion 1602. Any UE may determine the paging frame 1601 and paging occasion 1602 in period T 1605 for monitoring the PDCCH for paging (e.g., the PDCCH having the CRC set or scrambled with the P-RNTI) based on its own UE ID UE_ID. As an example, the paging frame and paging occasion may be determined based on Equations 4 and 5 described above. In other words, the paging frame may be determined by Equation 4, and the paging occasion index i_s may be determined by Equation 5.

The UE group to monitor specific paging occasion B in specific paging frame A may be determined based on Equations 4 and 5 described above. More specifically, when there are UEs having M different UE_IDs as an example, each UE may determine one paging frame among the N paging frames 1601 in period T 1601, in FIG. 16, based on the UE_ID set thereto (refer to Equation 4). Through this process, the M UEs may be equally distributed over the N paging frames. In other words, a UE group constituted of about M'=M/N UEs may be allocated within one paging frame. The UEs in the UE group of specific paging frame A may determine one paging occasion B among Ns paging occasions 1602 which is the number of the paging occasions for one paging frame present in paging frame A based on the UE_ID. Through this process, one paging occasion 1602 may be again allocated to the UE group constituted of M''=M'/Ns=(M/N)/Ns UEs. As a result, in a case where N paging frames 1601 are present in period T 1601, and Ns paging occasions 1602 are present in each paging frame, the M UEs may be equally distributed over the N*Ns paging occasions, so that the number of UEs in the UE group to monitor a specific paging occasion may be about M''=(M/N)/Ns.

One or more PDCCH monitoring occasions 1603 may exist in one paging occasion 1602. For example, there may be X*S PDCCH monitoring occasions, where 'X' may correspond to the number of PDCCH monitoring occasions per SS/PBCH block in the paging occasion set to the UE from the base station (e.g., higher layer signaling parameter nrofPDCCH-MontiroingOccasionPerSSB-InPO), 'S' may correspond to the number of SS/PBCH blocks (SSBs) actually transmitted, and, if there is no corresponding configuration information, the UE may assume that X=1 or a preset value. The [x*S+K]th PDCCH monitoring occasion in the paging occasion (where x=0, 1, 2, . . . , X−1 and may be defined as K=1, 2, 3, . . . , S) may correspond to the Kth transmission SS/PBCH block. Starting with the first PDCCH monitoring occasion in the paging frame, PDCCH monitoring occasions that do not overlap the uplink (UL) symbol may be sequentially numbered from 0. In FIG. 16, the case where X=1 and S=4 is illustrated as an example, and accordingly, four (i.e., X*S) PDCCH monitoring occasions 1603 may exist in one paging occasion 1602. The UE may determine paging occasion B in paging frame A based on Equations 4 and 5 and monitor all the PDCCH monitoring occasions present in paging occasion B. In this case, each of the PDCCH monitoring occasions monitored by the UE may correspond to a different SS/PBCH block.

According to an embodiment of the disclosure, when the UE is configured with control resource set #0 as the control resource set for monitoring the paging PDCCH and is configured with search space #X (X≠0) whose search space ID is not 0, as the search space, the UE may monitor a plurality of PDCCH monitoring occasions in one paging occasion to monitor the paging PDCCH as described above, and the PDCCH monitoring occasions may correspond to different SSs/PBCHs, respectively. In this case, as a result, one control resource set #0 where the UE monitors the PDCCH corresponds to different SSs/PBCHs. In general, when the UE monitors the PDCCH, one QCL assumption is made for the DMRS antenna port of the PDCCH transmitted in one control resource set. In the above-described paging method, one control resource set #0 may correspond to different SSs/PBCHs, a method in which the UE monitors the PDCCH or a QCL assumption method may further be required.

According to an embodiment of the disclosure, when the UE is configured with control resource set #0 as the control resource set for monitoring the paging PDCCH and is configured with search space #X (X≠0) whose search space ID is not 0, as the search space, the UE may control the PDSCH reception operation for paging and the PDCCH for paging by a method corresponding to at least one or a combination of one or more of the methods described below.

Method 1

When the UE is configured with control resource set #0 as the control resource set for monitoring the PDCCH for paging and is configured with search space #X (X≠0), as the search space, the UE may assume that, for the PDCCH receivable on all PDCCH monitoring occasions in specific paging occasion B in specific paging frame A, the SS/PBCH block where the DMRS antenna port of the PDCCH and the DMRS antenna port of the PDSCH scheduled with the PDCCH are associated with control resource set #0 is QCLed in terms of at least one of QCL-TypeA or QCL-TypeD.

In a specific example, the UE may receive SS/PBCH block A and receive configuration information about control resource set #0 from the received PBCH and configuration information about search space #X (X≠0) from SIB1. The UE may monitor the PDCCH for paging based on the received control resource set #0 and search space #X (X≠0). In this case, the UE may monitor the paging PDCCH on a plurality of PDCCH monitoring occasions within specific paging occasion B in specific paging frame A. In this case, the UE may assume that the DMRS antenna port of the PDCCH receivable on all corresponding PDCCH monitoring occasions and the DMRS antenna port of the PDSCH scheduled by the PDCCH are all QCLed with SS/PBCH block A. Accordingly, the UE may perform reception based on the reception parameter when receiving SS/PBCH block A when receiving the PDCCH and PDSCH for paging.

Method 2

When the UE is configured with control resource set #0 as the control resource set for monitoring the PDCCH for paging and is configured with search space #X (X≠0) as the search space, the UE may perform monitoring on the PDCCH for paging on the PDCCH monitoring occasion corresponding to the SS/PBCH block associated with control resource set #0 among a plurality of PDCCH monitoring occasions in specific paging occasion B in specific paging frame A. Further, the UE may assume that the SS/PBCH block where the DMRS antenna port of the PDCCH and the DMRS antenna port of the PDSCH scheduled by the PDCCH are associated with control resource set #0 is QCLed in terms of at least one of QCL-TypeA or QCL-TypeD.

In a specific example, the UE may receive SS/PBCH block A and receive configuration information about control resource set #0 from the received PBCH and configuration information about search space #X (X≠0) from SIB1. The UE may monitor the PDCCH for paging based on the received control resource set #0 and search space #X (X≠0). In this case, for the UE, X*S PDCCH monitoring occasions may be present in specific paging occasion B in specific paging frame A, and the [x*S+K]th (where, x=0, 1, 2, ..., X−1 and may be defined as K=1, 2, 3, ..., S) PDCCH monitoring occasion in paging occasion B may correspond to the Kth transmission SS/PBCH block. If SS/PBCH block A corresponds to the Kath SS/PBCH block, the UE may monitor the PDCCH for paging on the [x*S+K$_A$] (where, x=0, 1, 2, ..., X−1) PDCCH monitoring occasions among the X*S PDCCH monitoring occasions. Further, the UE may assume that the DMRS antenna port of the PDCCH receivable on all corresponding PDCCH monitoring occasions and the DMRS antenna port of the PDSCH scheduled by the PDCCH are all QCLed with SS/PBCH block A. Accordingly, the UE may perform reception based on the reception parameter when receiving SS/PBCH block A when receiving the PDCCH and PDSCH for paging.

Method 3

When the UE is configured with control resource set #0 as the control resource set for monitoring the PDCCH for paging and is configured with search space #X (X≠0) as the search space, if the UE monitors the paging PDCCH on a plurality of PDCCH monitoring occasions in specific paging occasion B in specific paging frame A, the UE may assume QCL based on the SS/PBCH block corresponding to each PDCCH monitoring occasion and receive the PDCCH and PDSCH for paging. More specifically, X*S PDCCH monitoring occasions may be present in specific paging occasion B in specific paging frame A, and the M=[x*S+K]th (where, x=0, 1, 2, ..., X−1 and may be defined as K=1, 2, 3, ..., S) PDCCH monitoring occasion in paging occasion B may correspond to the Kth transmission SS/PBCH block. The UE may assume that the DMRS antenna port of the PDCCH receivable on the Mth PDCCH monitoring occasion and the DMRS antenna port of the PDSCH scheduled by the PDCCH are QCLed with the Kth® SS/PBCH block in terms of at least one of QCL-TypeA or QCL-TypeD.

In a specific example, the UE may receive SS/PBCH block A and receive configuration information about control resource set #0 from the received PBCH and configuration information about search space #X (X≠0) from SIB1. The UE may monitor the PDCCH for paging based on the received control resource set #0 and search space #X (X≠0). In this case, for the UE, X*S PDCCH monitoring occasions may be present in specific paging occasion B in specific paging frame A, and the M=[x*S+K]th (where, x=0, 1, 2, ..., X−1 and may be defined as K=1, 2, 3, ..., S) PDCCH monitoring occasion in paging occasion B may correspond to the Kth transmission SS/PBCH block. When monitoring the paging PDCCH on any Mth PDCCH monitoring occasion, the UE may assume that the DMRS of the PDCCH receivable on the Mth PDCCH monitoring occasion and the DMRS antenna port of the PDSCH scheduled by the PDCCH are QCLed with the Kth transmission SS/PBCH. Accordingly, when receiving the PDCCH and PDSCH for paging, the UE may determine the reception parameter based on a different SS/PBCH block on each PDCCH monitoring occasion.

Method 4

When the UE is configured with control resource set #0 as the control resource set for monitoring the PDCCH for paging and is configured with search space #X (X≠0) as the search space, if the UE monitors the paging PDCCH on a plurality of PDCCH monitoring occasions in specific paging occasion B in specific paging frame A, the UE may assume QCL based on the SS/PBCH block corresponding to each PDCCH monitoring occasion and receive the paging PDCCH and paging PDSCH. In this case, the SS/PBCH corresponding to each PDCCH monitoring occasion may be determined considering the SS/PBCH associated with set control resource set #0. For example, the plurality of PDCCH monitoring occasions in specific paging occasion B may be associated with the transmitted SS/PBCH blocks sequentially starting from SS/PBCH block L associated with control resource set #0 monitoring the PDCCH. Specifically, when the number of all transmission SS/PBCH blocks is S, the SS/PBCH block associated with control resource set #0 where the UE monitors the paging PDCCH is SSB #L, and there are PDCCH monitoring occasions {MO #1, MO #1, MO #2, MO #3, ..., MO #N} in specific paging occasion B, the PDCCH monitoring occasions may respectively correspond to {SSB #L, SSB #(L+1), SSB #(L+2), ..., SSB #(mod (L+S−1,S))}.

More specifically, there may be X*S PDCCH monitoring occasions in specific paging occasion B in specific paging frame A. In paging occasion B, the M=[x*S+K]th (where x=0, 1, 2, ..., X−1 and K=L, L+1, L+2, L+3, ..., mod (L+S−1,S)) where mod (L+S−1,S) is a modulo operation represented as (L+S−1) mod S. X*S PDCCH monitoring occasions each may correspond to the Kth transmitted SS/PBCH block. In this case, the Lth SS/PBCH block may correspond to the SS/PBCH block associated with control resource set #0. The UE may assume that the DMRS antenna port of the PDCCH receivable on the Mth PDCCH monitoring occasion and the DMRS antenna port of the PDSCH scheduled by the PDCCH are QCLed with the Kth SS/PBCH block in terms of at least one of QCL-TypeA or QCL-TypeD. When monitoring the paging PDCCH on any Mth PDCCH monitoring occasion, the UE may assume that the DMRS of the PDCCH receivable on the Mth PDCCH monitoring occasion and the DMRS antenna port of the PDSCH scheduled by the PDCCH are QCLed with the Kth transmission SS/PBCH. Accordingly, when receiving the PDCCH for paging and PDSCH for paging, the UE may determine the reception parameter based on a different SS/PBCH block on each PDCCH monitoring occasion.

Method 5

When the UE is configured with control resource set #0 as the control resource set for monitoring the PDCCH for paging and is configured with search space #X (X≠0) as the search space, the UE may monitor the paging PDCCH on the plurality of PDCCH monitoring occasions in specific paging occasion B in specific frame X. In this case, any Mth PDCCH monitoring occasion among the plurality of PDCCH monitoring occasions may correspond to the PDCCH monitoring occasion associated with control resource set #0 associated with the Kth SS/PBCH block. In other words, the plurality of PDCCH monitoring occasions may be constituted of PDCCH monitoring occasions associated with control resource set #0 associated with different SS/PBCH blocks. Accordingly, the UE may monitor the PDCCH for paging in control resource set #0 associated with the Kth SS/PBCH block corresponding to the Mth PDCCH monitoring occasion to monitor the PDCCH for paging on the Mth PDCCH monitoring occasion. For example, X*S PDCCH monitoring occasions may be present in specific paging occasion B in specific paging frame A, and the M=[x*S+K]th (where, x=0, 1, 2, . . . , X−1 and may be defined as K=1, 2, 3, . . . , S) PDCCH monitoring occasion in the paging occasion may correspond to the Kth transmission SS/PBCH block. When monitoring the paging PDCCH on the Mth PDCCH monitoring occasion, the UE may monitor the PDCCH for paging in control resource set #0 associated with the Kth SS/PBCH block. Further, the UE may assume that the DMRS antenna port of the PDCCH receivable on the Mth PDCCH monitoring occasion and the DMRS antenna port of the PDSCH scheduled by the PDCCH are QCLed with the Kth SS/PBCH block in terms of at least one of QCL-TypeA or QCL-TypeD.

Method 6

When the UE is configured with control resource set #0 as the control resource set for monitoring the paging PDCCH and is configured with search space #X (X≠0) as the search space, the QCL assumption for the DMRS antenna port of the PDCCH and the antenna port of the PDSCH scheduled by the PDCCH may be arbitrarily determined by the implementation of the UE. For example, the UE may perform the reception operation on the paging PDCCH and paging PDSCH based on at least one operation of methods 1 to 5 described above.

As described above, according to an embodiment of the disclosure, the base station may set control resource set #0 as the control resource set for the paging PDCCH and search space #0 as the search space, to the UE. In this case, the base station may transmit the paging PDCCH of the same information on the plurality of PDCCH monitoring occasions in any paging occasion B in any paging frame A, to the UE. In this case, when transmitting the PDCCH for paging on any Mth PDCCH monitoring occasion among the plurality of PDCCH monitoring occasions to the UE, the base station may transmit the PDSCH for paging scheduled by the PDCCH for paging and the PDCCH for paging based on the same (or similar) transmission parameter as when transmitting the Kth SS/PBCH block corresponding to the Mth PDCCH monitoring occasion. As an example, when transmitting the PDCCH for paging on the Mth PDCCH monitoring occasion, the base station may transmit the PDCCH and PDSCH for paging with the same beam as the transmission beam used when transmitting the corresponding Kth SS/PBCH block.

Further, according to an embodiment of the disclosure, the UE may not be expected to be configured with control resource set #0 as the control resource set for monitoring the paging PDCCH and be configured with search space #X (X≠0) whose search space ID is not 0 as the search space. If receiving the corresponding configuration information, the UE may regard the received configuration information as an error and perform a default operation (or fallback operation) when configuration information is an error. As an example, upon determining that the received configuration information is an error, the UE may disregard and discard the configuration information. In this case, the UE may receive the configuration information again.

A third embodiment of the disclosure proposes a method of assuming QCL when the UE monitors the paging PDCCH when the UE is configured with control resource set #X (which may be referred to as a second control resource set or specific control resource set) whose control resource set ID is not 0 as the control resource set for monitoring the PDCCH for paging and is configured with search space #Y (Y≠0) (which may be referred to as a second search space or a specific search space) whose search space ID is not 0 as the search space.

According to an embodiment of the disclosure, when the UE is configured with control resource set #X (X≠0) as the control resource set for monitoring the PDCCH for paging and is configured with search space #Y (Y≠0) as the search space, the UE may control the PDSCH reception operation for paging and the PDCCH for paging by a method corresponding to at least one or a combination of one or more of the methods described below.

When the UE is configured with control resource set #X (X≠0) as the control resource set for monitoring the paging PDCCH and is configured with search space #Y (Y≠0) as the search space, if the UE monitors the PDCCH for paging on a plurality of PDCCH monitoring occasions in specific paging occasion B in specific paging frame A, the UE may assume QCL based on the SS/PBCH block corresponding to each PDCCH monitoring occasion and receive the PDCCH and PDSCH for paging. More specifically, X*S PDCCH monitoring occasions may be present in specific paging occasion B in specific paging frame A, and the M=[x*S+K]th (where, x=0, 1, 2, . . . , X−1 and may be defined as K=1, 2, 3, . . . , S) PDCCH monitoring occasion in paging occasion B may correspond to the Kth transmission SS/PBCH block. The UE may assume that the DMRS antenna port of the PDCCH receivable on the Mth PDCCH monitoring occasion and the DMRS antenna port of the PDSCH scheduled by the PDCCH are QCLed with the Kth SS/PBCH block in terms of at least one of QCL-TypeA and QCL-TypeD.

An embodiment of the disclosure is described with a specific example. The UE may receive configuration information about control resource set #X (X≠0) and configuration information about search space #Y (Y≠0) from the base station, by higher layer signaling, e.g., SIB1. The UE may monitor the PDCCH for paging based on the received configuration information about control resource set #X and search space #Y (Y≠0). In this case, for the UE, X*S PDCCH monitoring occasions may be present in specific paging occasion B in specific paging frame A, and the M=[x*S+K]th (where, x=0, 1, 2, . . . , X−1 and may be defined as K=1, 2, 3, . . . , S) PDCCH monitoring occasion in paging occasion B may correspond to the Kth transmission SS/PBCH block. When monitoring the paging PDCCH on any Mth PDCCH monitoring occasion, the UE may assume that the DMRS of the PDCCH receivable on the Mth PDCCH monitoring occasion and the DMRS antenna port of the PDSCH scheduled by the PDCCH are QCLed with the Kth transmission SS/PBCH. Accordingly, when receiving the PDCCH and PDSCH for paging, the UE may determine the reception parameter based on a different SS/PBCH block on each PDCCH monitoring occasion.

According to an embodiment of the disclosure, the base station may set control resource set #X (X≠0) as the control resource set for monitoring the PDCCH for paging and search space #Y (Y≠0) as the search space, to the UE. In this case, the base station may transmit the paging PDCCH of the same information on the plurality of PDCCH monitoring occasions in any paging occasion B in any paging frame A, to the UE. In this case, when transmitting the PDCCH for paging on any Mth PDCCH monitoring occasion among the plurality of PDCCH monitoring occasions to the UE, the base station may transmit the PDSCH for paging scheduled by the PDCCH and the PDCCH for paging based on the same (or similar) transmission parameter as when transmitting the Kth SS/PBCH block corresponding to the Mth PDCCH monitoring occasion. As an example, when transmitting the paging PDCCH on the Mth PDCCH monitoring occasion, the base station may transmit the PDCCH and PDSCH for paging with the same beam as the transmission beam used when transmitting the corresponding Kth SS/PBCH block.

According to an embodiment of the disclosure, the UE may not be expected to be configured with control resource set #X (X≠0) as the control resource set for monitoring the paging PDCCH and be configured with search space #Y (Y≠0) whose search space ID is not 0 as the search space. If receiving the corresponding configuration information, the UE may regard the received configuration information as an error and perform a default operation (or fallback operation) when configuration information is an error. As an example, upon determining that the received configuration information is an error, the UE may disregard and discard the configuration information. In this case, the UE may receive the configuration information again.

All of the above-described embodiments of the disclosure may be implemented in combination. As an example, the above-described embodiments may be combined as follows.

As an example of a combined embodiment, as in the above-described first embodiment, in a case where the UE is configured with control resource set #0 as the control resource set for paging PDCCH and is configured with search space #0 as the search space through configuration information from the base station, the UE may assume that the SS/PBCH block where the DMRS antenna port of the PDCCH received through control resource set #0 and the DMRS antenna port of the PDSCH scheduled by the corresponding PDCCH are all associated with control resource set #0 is QCLed in terms of at least one of QCL-TypeA or QCL-TypeD.

Further, as in the above-described second embodiment, in a case where the UE is configured with control resource set #0 as the control resource set for paging PDCCH and is configured with search space #X (X≠0) as the search space through configuration information from the base station, the UE may assume that the SS/PBCH block where the DMRS antenna port of the PDCCH and the DMRS antenna port of the PDSCH scheduled by the corresponding PDCCH are associated with control resource set #0 is QCLed in terms of at least one of QCL-TypeA or QCL-TypeD, for the PDCCH receivable on all the PDCCH monitoring occasions in specific paging occasion B in specific paging frame A.

Further, as in the above-described third embodiment, when the UE is configured with control resource set #X (X≠0) as the control resource set for monitoring the paging PDCCH and is configured with search space #Y (Y≠0) as the search space through the configuration information from the base station, if the UE monitors the paging PDCCH on a plurality of PDCCH monitoring occasions in specific paging occasion B in specific paging frame A, the UE may assume QCL based on the SS/PBCH block corresponding to each PDCCH monitoring occasion and receive the PDCCH and PDSCH for paging. More specifically, X*S PDCCH monitoring occasions may be present in specific paging occasion B in specific paging frame A, and the M=[x*S+K]th (where, x=0, 1, 2, . . . , X−1 and may be defined as K=1, 2, 3, . . . , S) PDCCH monitoring occasion in paging occasion B may correspond to the Kth transmission SS/PBCH block. The UE may assume that the DMRS antenna port of the PDCCH receivable on the Mth PDCCH monitoring occasion and the DMRS antenna port of the PDSCH scheduled by the PDCCH are QCLed with the Kth SS/PBCH block in terms of at least one of QCL-TypeA or QCL-TypeD.

As another example of the combined embodiment, as in the above-described first embodiment, in a case where the UE is configured with control resource set #0 as the control resource set for paging PDCCH and is configured with search space #0 as the search space through configuration information from the base station, the UE may assume that the SS/PBCH block where the DMRS antenna port of the PDCCH received through control resource set #0 and the DMRS antenna port of the PDSCH scheduled by the corresponding PDCCH are all associated with control resource set #0 is QCLed in terms of at least one of QCL-TypeA or QCL-TypeD.

Further, as in the above-described second embodiment, in a case where the UE is configured with control resource set #0 as the control resource set for paging PDCCH and is configured with search space #X (X≠0) as the search space through configuration information from the base station, the UE may assume that the SS/PBCH block where the DMRS antenna port of the PDCCH and the DMRS antenna port of the PDSCH scheduled by the corresponding PDCCH are associated with control resource set #0 is QCLed in terms of at least one of QCL-TypeA or QCL-TypeD, for the PDCCH receivable on all the PDCCH monitoring occasions in specific paging occasion B in specific paging frame A.

Further, as in the above-described third embodiment, the UE may not be expected to be configured with control resource set #X (X≠0) as the control resource set for monitoring the paging PDCCH and be configured with search space #Y (Y≠0) whose search space ID is not 0 as the search space. In this case, if receiving the corresponding configuration information, the UE may regard the received configuration information as an error and perform a default operation (or fallback operation) when configuration information is an error.

Figure 17A:
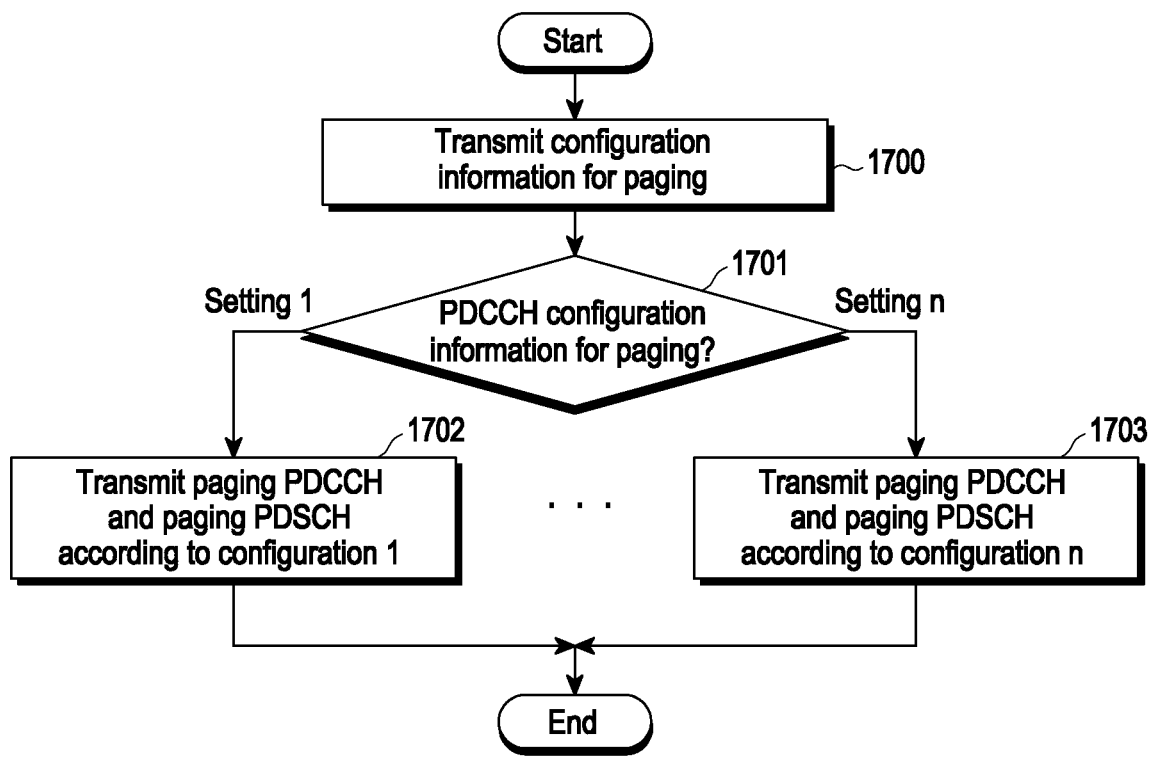
FIGS. 17A and 17B illustrate operations of a base station and a UE according to various embodiments of the disclosure.

FIG. 17A is a view illustrating operations of a base station according to an embodiment of the disclosure.

The operations of the base station are described with reference to FIG. 17A. In step 1700, the base station transmits configuration information for paging. The configuration information for paging may include at least one of information about the control resource set related to the PDCCH for paging and information about the search space. The configuration information for paging may be provided to the UE through the higher layer signaling (MIB, SIB, or RRC information) of the base station or DCI. The configuration information for paging may have various configurations through each or possible combinations of the above-described first embodiment to third embodiment and, based on the network state, the channel state of the UE, or determined conditions, the base station may configure the configuration information for paging in various forms and transmit it. In the example of FIG. 17A, the configuration information for paging may have, e.g., n different configurations.

The base station may perform transmission of the PDCCH and PDSCH for paging, based on the transmitted configuration information. In steps 1701 and 1702 of FIG. 17A, when the transmitted configuration information corresponds to configuration 1, the base station transmits the PDCCH for paging on the PDCCH monitoring occasion determined according to configuration 1 and transmits the paging message scheduled according to the PDCCH, on the PDSCH. In steps 1701 and 1703, when the transmitted configuration information corresponds to configuration n, the base station transmits the PDCCH for paging on the PDCCH monitoring occasion determined according to configuration n and transmits the paging message scheduled according to the PDCCH, on the PDSCH. In this case, the PDCCH and PDSCH for paging may be transmitted using the parameters used when transmitting the synchronization signal block (SSB) having a QCL relationship with the PDCCH and PDSCH (e.g., using the same transmission beam as that used when transmitting the SSB).

Further, in the disclosure, the base station may transmit configuration information including at least one of information about the control resource set and information about the search space, related to the PDCCH for paging, identify the synchronization signal block (SSB) corresponding to the PDCCH monitoring occasion in the control resource set and search space set based on the configuration information, and perform PDCCH transmission and PDSCH transmission for paging using the same transmission beam as the transmission beam when transmitting the synchronization signal block (SSB).

Figure 17B:
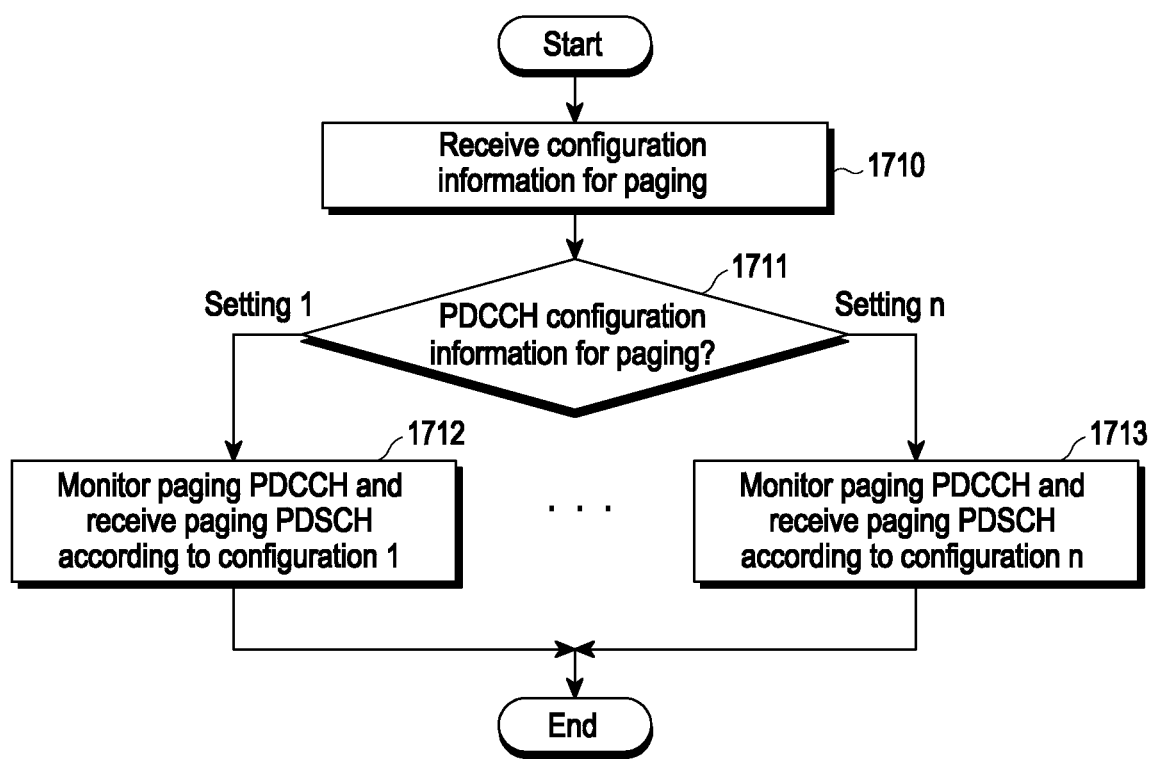

FIG. 17B is a view illustrating operations of a UE according to an embodiment of the disclosure.

The operations of the UE are described with reference to FIG. 17B. In step 1710, the UE receives configuration information for paging. The configuration information for paging may include at least one of information about the control resource set related to the PDCCH for paging and information about the search space. The configuration information for paging may be provided to the UE through the higher layer signaling (MIB, SIB, or RRC information) of the base station or DCI. The configuration information for paging may have various configurations through each or possible combinations of the above-described first embodiment to third embodiment. In the example of FIG. 17B, the configuration information for paging may have, e.g., n different configurations.

The UE may perform PDCCH monitoring and PDSCH reception for paging, based on the received configuration information. In steps 1711 and 1712 of FIG. 17B, in a case where the received configuration information corresponds to configuration 1, upon monitoring the PDCCH for paging on the PDCCH monitoring occasion determined according to configuration 1 to detect the PDCCH corresponding to the P-RNTI, the UE receives the PDCCH and receives the paging message scheduled according to the PDCCH, on the PDSCH. In steps 1711 and 1713, in a case where the received configuration information corresponds to configuration n, upon monitoring the PDCCH for paging on the PDCCH monitoring occasion determined according to configuration n to detect the PDCCH corresponding to the P-RNTI, the UE receives the PDCCH and receives the PDSCH including the paging message scheduled according to the PDCCH, on the PDSCH. In this case, the PDCCH and PDSCH for paging may be transmitted using the parameters used when receiving the synchronization signal block (SSB) having a QCL relationship with the PDCCH and PDSCH (e.g., using the same reception beam as that used when receiving the SSB).

Further, in the disclosure, the UE may receive configuration information including at least one of information about the control resource set and information about the search space, related to the PDCCH for paging, identify the synchronization signal block (SSB) corresponding to the PDCCH monitoring occasion in the control resource set and search space set based on the configuration information, perform PDCCH monitoring for paging using the same reception beam as the reception beam when receiving the synchronization signal block (SSB), and receive the paging message on the PDSCH scheduled through the PDCCH.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the present disclosure have been described above, various changes may be made thereto without departing from the scope of the present disclosure. Thus, the scope of the disclosure should not be limited to the above-described embodiments, and should rather be defined by the following claims and equivalents thereof.

The invention claimed is:

1. A method by a UE configured to receive a paging in a wireless communication system, the method comprising:
receiving, from a base station, configuration information including information about a control resource set among a plurality of control resource sets and information about a search space among a plurality of search spaces related to a physical downlink control channel (PDCCH) for the paging, the configuration information configured based on a channel state of the UE or a network state among a plurality of configuration information configurable based on the plurality of control resource sets and the plurality of search spaces;
identifying a synchronization signal block (SSB) corresponding to a PDCCH monitoring occasion in a control resource set and a search space set based on the received configuration information; and
performing PDCCH monitoring for the paging using the same reception beam as a reception beam used when receiving the SSB and receiving a paging message on a physical downlink shared channel (PDSCH) scheduled through the PDCCH.

2. The method of claim 1, wherein the PDCCH for the paging and the PDSCH have a quasi co-location (QCL) relationship with the SSB.

3. The method of claim 1, wherein the reception beam is determined based on a different synchronization signal block (SSB) on each PDCCH monitoring occasion.

4. The method of claim 1, wherein
in case that the control resource set is set to a common control resource set, and the search space is set to a common search space set in the configuration information, an [x*S+K]th PDCCH monitoring occasion in a paging occasion corresponds to a Kth transmitted synchronization signal block, wherein x=0, 1, 2, . . . , X−1, and K=1, 2, 3, . . . , S, and wherein the paging occasion is a set of 'S*X' contiguous PDCCH monitoring occasions, S is a number of actually transmitted synchronization signal blocks, and X is a number of PDCCH monitoring occasions per SSB in the paging occasion.

5. The method of claim 1, further comprising:
regarding the received configuration information as an error in case that the received configuration information is not configuration information desired by the UE; and
receiving again the configuration information for the paging from the base station.

6. A user equipment (UE) in a wireless communication system, comprising:
a transceiver; and
a processor configured to:
receive, from a base station through the transceiver, configuration information including information about a control resource set among a plurality of control resource sets and information about a search space among a plurality of search spaces related to a physical downlink control channel (PDCCH) for a paging, the configuration information configured based on a channel state of the UE or a network state among a plurality of configuration information configurable based on the plurality of control resource sets and the plurality of search spaces,
identify a synchronization signal block (SSB) corresponding to a PDCCH monitoring occasion in a control resource set and a search space set based on the received configuration information, and perform PDCCH monitoring for the paging using the same reception beam as a reception beam used when receiving the SSB and receive a paging message on a physical downlink shared channel (PDSCH) scheduled through the PDCCH.

7. The UE of claim 6, wherein the PDCCH for the paging and the PDSCH have a quasi co-location (QCL) relationship with the SSB.

8. The UE of claim 6, wherein the reception beam is determined based on a different SSB on each PDCCH monitoring occasion.

9. The UE of claim 6, wherein, in case that the control resource set is set to a common control resource set, and the search space set is set to a common search space set in the configuration information, an [x*S+K]th PDCCH monitoring occasion in a paging occasion corresponds to a Kth transmitted synchronization signal block, wherein x=0, 1, 2, . . . , X−1, and K=1, 2, 3, . . . , S, and wherein the paging occasion is a set of 'S*X' contiguous PDCCH monitoring occasions, S is a number of actually transmitted synchronization signal blocks, and X is a number of PDCCH monitoring occasions per SSB in the paging occasion.

10. The UE of claim 6, whether the processor is further configured to:
regard the received configuration information as an error in case that the received configuration information is not configuration information desired by the UE, and
receive again the configuration information for the paging from the base station.

11. A method by a base station configured to transmit a paging in a wireless communication system, the method comprising:
transmitting configuration information including information about a control resource set among a plurality of control resource sets and information about a search space among a plurality of search spaces related to a physical downlink control channel (PDCCH) for the paging, the configuration information configured based on a channel state of a user equipment (UE) or a network state among a plurality of configuration information configurable based on the plurality of control resource sets and the plurality of search spaces;
identifying a synchronization signal block (SSB) corresponding to a PDCCH monitoring occasion in a control resource set and a search space set based on the transmitted configuration information; and
performing PDCCH transmission and physical downlink shared channel (PDSCH) transmission for the paging using the same transmission beam as a transmission beam used when transmitting the SSB.

12. The method of claim 11, wherein the PDCCH for the paging and the PDSCH have a quasi co-location (QCL) relationship with the SSB.

13. The method of claim 11, wherein the transmission beam is determined based on a different SSB on each PDCCH monitoring occasion.

14. The method of claim 11, wherein, in case that the control resource set is set to a common control resource set, and the search space set is set to a common search space set in the configuration information, an [x*S+K]th PDCCH monitoring occasion in the paging occasion corresponds to a Kth transmitted synchronization signal block, wherein x=0, 1, 2, . . . , X−1, and K=1, 2, 3, . . . , S, and wherein the paging occasion is a set of 'S*X' contiguous PDCCH monitoring occasions, S is a number of actually transmitted synchronization signal blocks, and X is a number of PDCCH monitoring occasions per SSB in the paging occasion.

15. The method of claim 11, wherein in case that the control resource set is set to a specific control resource set, and the search space set is set to a specific search space set in the configuration information, X*S PDCCH monitoring occasions are present in a specific paging occasion in a specific paging frame, and an M=[x*S+K]th PDCCH monitoring occasion in the specific paging occasion corresponds to a Kth transmitted SSB, and wherein x=0, 1, 2, . . . , X−1, and K=1, 2, 3, . . . , S.

16. A base station in a wireless communication system, the base station comprising:
- a transceiver; and
- a processor configured to transmit configuration information including information about a control resource set among a plurality of control resource sets and information about a search space among a plurality of search spaces related to a physical downlink control channel (PDCCH) for a paging, the configuration information configured based on a channel state of a user equipment (UE) or a network state among a plurality of configuration information configurable based on the plurality of control resource sets and the plurality of search spaces,
- identify a synchronization signal block (SSB) corresponding to a PDCCH monitoring occasion in a control resource set and a search space set based on the transmitted configuration information, and perform PDCCH transmission and physical downlink shared channel (PDSCH) transmission for the paging using the same transmission beam as a transmission beam used when transmitting the SSB.

17. The base station of claim 16, wherein the PDCCH for the paging and the PDSCH have a quasi co-location (QCL) relationship with the SSB.

18. The base station of claim 16, wherein the transmission beam is determined based on a different SSB on each PDCCH monitoring occasion.

19. The base station of claim 16, wherein, in case that the control resource set is set to a common control resource set, and the search space set is set to a common search space set in the configuration information, an [x*S+K]th PDCCH monitoring occasion in the paging occasion corresponds to a Kth transmitted synchronization signal block, wherein x=0, 1, 2, . . . , X−1, and K=1, 2, 3, . . . , S, and wherein the paging occasion is a set of 'S*X' contiguous PDCCH monitoring occasions, S is a number of actually transmitted synchronization signal blocks, and X is a number of PDCCH monitoring occasions per SSB in the paging occasion.

20. The base station of claim 16, wherein, in case that the control resource set is set to a specific control resource set, and the search space set is set to a specific search space set in the configuration information, X*S PDCCH monitoring occasions are present in a specific paging occasion in a specific paging frame, and an M=[x*S+K]th PDCCH monitoring occasion in the specific paging occasion corresponds to a Kth transmitted SSB, and wherein x=0, 1, 2, . . . , X−1, and K=1, 2, 3, . . . , S.

* * * * *